United States Patent
Lee et al.

(10) Patent No.: US 8,755,365 B2
(45) Date of Patent: Jun. 17, 2014

(54) METHOD AND A BASE STATION FOR TRANSMITTING A CSI-RS, AND A METHOD AND USER EQUIPMENT FOR RECEIVING THE CSI-RS

(75) Inventors: Moon Il Lee, Anyang-si (KR); Bin Chul Ihm, Anyang-si (KR); Hyun Soo Ko, Anyang-si (KR); Jae Hoon Chung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 251 days.

(21) Appl. No.: 13/508,334

(22) PCT Filed: Nov. 4, 2010

(86) PCT No.: PCT/KR2010/007732
§ 371 (c)(1),
(2), (4) Date: May 4, 2012

(87) PCT Pub. No.: WO2011/055986
PCT Pub. Date: May 12, 2011

(65) Prior Publication Data
US 2012/0220327 A1    Aug. 30, 2012

Related U.S. Application Data

(60) Provisional application No. 61/259,199, filed on Nov. 8, 2009.

(51) Int. Cl.
*H04Q 7/24*  (2006.01)

(52) U.S. Cl.
USPC ........... 370/338; 370/329; 370/208; 370/342; 455/450

(58) Field of Classification Search
USPC ........................................ 455/450
See application file for complete search history.

(56) References Cited

U.S. PATENT DOCUMENTS

2011/0244877 A1*  10/2011  Farajidana et al. ........ 455/452.2

OTHER PUBLICATIONS

3GPP TS 36.211 v.8.5.0, "Evolved Universal Terrestrial Radio Access (E-UTRA); Physical Channels and Modulation (Release 8)", 3GPP TS 36.211 v.8.5.0, Dec. 2008.
R1-091714, "DL Reference Signal Design for CSI generation in LTE-Advanced", 3GPP TSG-RAN WG1 #57, May 4-8, 2009.
R1-094171, "Further Details on CSI-RS Design for LTE-Advanced", 3GPP TSG-RAN WG1 #58bis, Oct. 12-16, 2009.
R1-093375, "Discussions on CSI-RS for LTE-Advanced", 3GPP TSG-RAN WG1 #58, Aug. 24-28, 2009.

* cited by examiner

*Primary Examiner* — Duc C Ho
(74) *Attorney, Agent, or Firm* — McKenna Long & Aldridge LLP

(57) ABSTRACT

A base station in a wireless communication system transmits a CSI-RS of a cell every 1×N subframes or 1×N ms with muting CSI-RS REs of a neighboring cell every m×N subframes. A BS can estimate channel state of the neighboring cell with higher accuracy by using a CSI-RS of the neighboring cell received in the muted REs.

16 Claims, 27 Drawing Sheets

(a) 1Tx of 2Tx case (b) 4Tx case (a)

(b)

(a)

(b)

(a)

(b)

METHOD AND A BASE STATION FOR TRANSMITTING A CSI-RS, AND A METHOD AND USER EQUIPMENT FOR RECEIVING THE CSI-RS

This Application is a 35 U.S.C. §371 National Stage entry of International Application No. PCT/KR2010/007732, filed Nov. 4, 2010, and claims the benefit of U.S. Provisional Application No. 61/259,199, filed Nov. 8, 2009, both of which are incorporated by reference in their entirety herein.

TECHNICAL FIELD

The present invention relates to a wireless communication system, and more particularly, to a method and an apparatus for transmitting a reference signal for interference measurement and/or channel estimation in a wireless communication system, and a method and an apparatus for receiving the reference and measuring/estimating channel interference or channel state by using the reference signal.

BACKGROUND ART

A transmitting device in a wireless communication system transmits a signal over a radio frequency (RF) channel. In this case, an unexpected distortion may occur in the transmitted signal. Besides, the transmitting device may precode the signal and transmit the precoded signal to the receiving device. In order for a receiving device to receive/detect the original signal, information on state of the channel, information on interference which affect to the signal, and/or information for demodulating the transmitted signal is required. By using the information, the receiving device can correct the distortion occurred to the transmitted signal and/or obtain the original signal with a higher accuracy.

In order for the receiving device to estimate the state of the channel and/or measure the interference occurred by the other signals, accurate measurement techniques are required.

DISCLOSURE OF INVENTION

Technical Problem

Accordingly, the present invention is directed to a method and a base station for effectively transmitting data and/or reference signals, and a method and a user equipment for receiving data and/or reference signal and measuring a channel state and/or interference.

An object of the present invention is to provide methods for muting resource elements that can maximize the accuracy of inter-cell interference measurement.

Also, an object of the present invention is to provide methods for muting resource elements that can maximize the accuracy of channel state measurement of a serving cell and/or one or more neighboring cells.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Solution to Problem

The present invention relates to a wireless communication system. More particularly, the present invention relates to a method and an apparatus for transmitting a reference signal for interference measurement and/or channel estimation in a wireless communication system, and a method and an apparatus for receiving the reference and measuring/estimating channel interference or channel state by using the reference signal.

To achieve these objects and other advantages and in accordance with the purpose of the invention, as embodied and broadly described herein, in a base station in a wireless communicating system, a method for transmitting a channel state information reference signal (CSI-RS) of a cell is provided. The method comprises: allocating the CSI-RS of the cell to a subframe; and transmitting the CSI-RS of the cell with a first duty cycle of 1×N subframes, where 1 is a positive integer and N is a predetermined value, wherein the transmitting transmits the CSI-RS of the cell with muting a resource element on which a CSI-RS of a neighboring cell is transmitted, with a second duty cycle of m×N subframes where m is a positive integer equal to or larger than 1.

In another aspect of the present invention, in a base station in a wireless communicating system, a method for transmitting a channel state information reference signal (CSI-RS) of a cell is provided. The base station comprises: a transmitter configured to transmit a signal; and a processor, operatively coupled to the transmitter, configured to allocate the CSI-RS of the cell to a subframe; and configured to control the transmitter to transmit the CSI-RS of the cell with a first duty cycle of 1×N subframes, where 1 is a positive integer and N is a predetermined value, wherein the processor is configured to control the transmitter to mute, with a second duty cycle of m×N subframes, resource element on which a CSI-RS of a neighboring cell is transmitted, where m is a positive integer equal to or larger than 1.

In still another aspect of the present invention, in a user equipment located in a cell in a wireless communicating system, a method for receiving a channel state information reference signal (CSI-RS) of the cell is provided. The method comprises: receiving the CSI-RS of the cell transmitted in a subframe with a first duty cycle of 1×N subframes, wherein the subframe includes, with a second duty cycle of m×N subframes, a muted resource element on which a CSI-RS of a neighboring cell is transmitted, where 1 is a positive integer, m is a positive integer equal to or larger than 1, and N is a predetermined value; and receiving the CSI-RS of the neighboring cell in the muted resource element; and measuring channel quality of the cell based on the received CSI-RS of the cell and channel quality of the neighboring cell based on the received CSI-RS of the neighboring cell.

In further still another aspect of the present invention, in a user equipment located in a cell in a wireless communicating system, a method for receiving a channel state information reference signal (CSI-RS) of the cell is provided. The user equipment comprises: a receiver configured to receive a signal; and a processor configured to control the receiver to receive the CSI-RS of the cell transmitted in a subframe with a first duty cycle of 1×N subframes, wherein the subframe includes, with a second duty cycle of m×N subframes, a muted resource element on which a CSI-RS of a neighboring cell is transmitted, where 1 is a positive integer, m is a positive integer equal to or larger than 1, and N is a predetermined value; configured to control the receiver to receive the CSI-RS of the neighboring cell in the muted resource element; and configured to measure channel quality of the cell based on the received CSI-RS of the cell and channel quality of the neighboring cell based on the received CSI-RS of the neighboring cell.

In each aspect of the present invention, the CSI-RS of the neighboring cell may be transmitted with a third duty cycle of n×N subframes where n is a positive integer, and m is the lowest common multiple of 1 and n.

In each aspect of the present invention, m may be a multiple of 1.

In each aspect of the present invention, the CSI-RS of the cell and the CSI-RS of the neighboring cell may be transmitted in subframes of which subframe numbers have the same remainder after divided by N.

The aforementioned technical solutions are only a part of the embodiments of the present invention, and various modifications to which technical features of the present invention are applied could be understood by the person with ordinary skill in the art to which the present invention pertains, based on the following detailed description of the present invention.

Advantageous Effects of Invention

According to the embodiments of the present invention, it is advantageous in that the accurate inter-cell interference measurement and/or the accurate other cell channel estimation/measurement can be achieved thereby allowing a BS and a UE to perform better channel adaption in accordance with the instantaneous channel condition.

It is to be understood that both the foregoing general description and the following detailed description of the present invention are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

MODE FOR THE INVENTION

Figure 1:
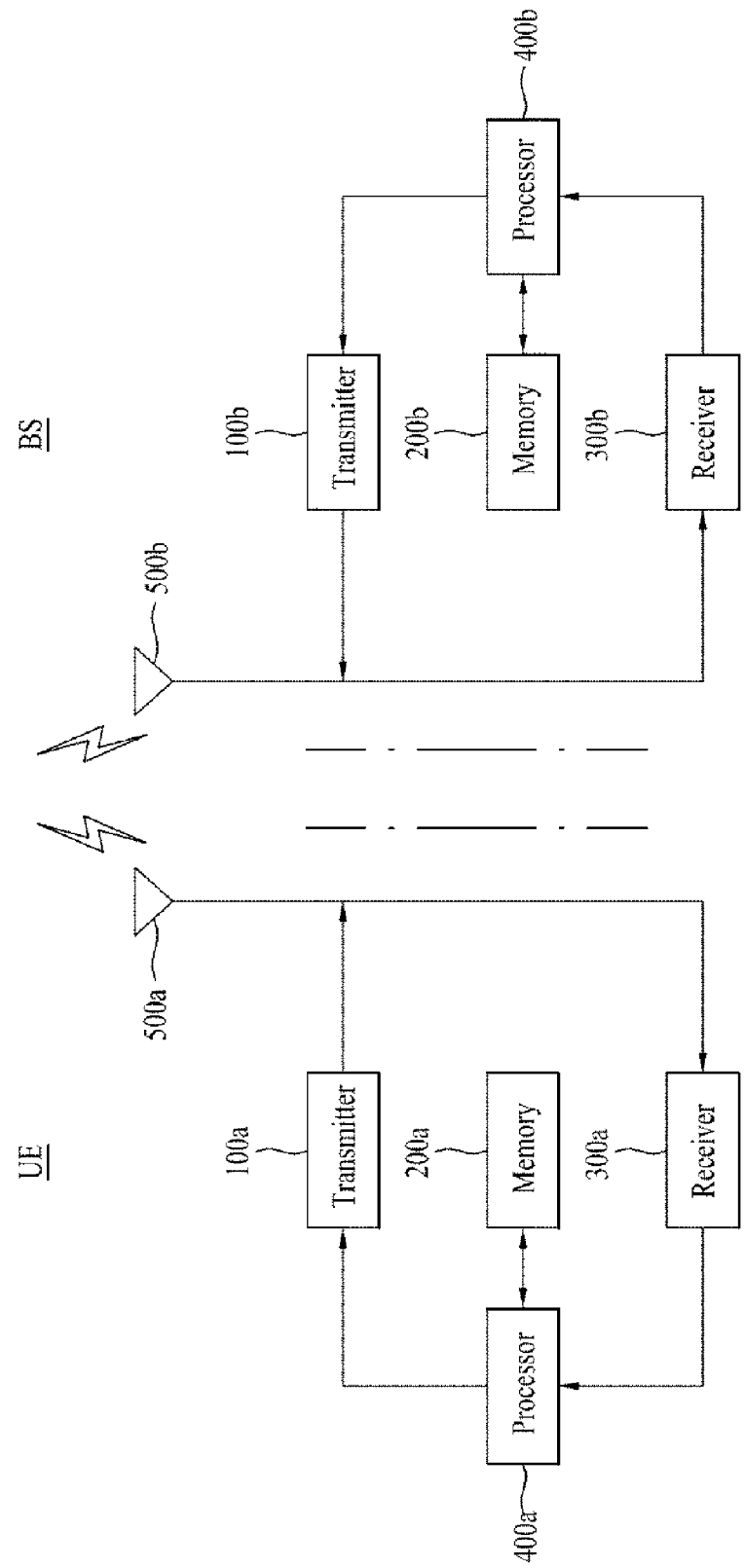
FIG. 1 is a block diagram illustrating a user equipment and a base station for implementing the present invention.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters.

Techniques, apparatus and systems described herein can be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as Universal Terrestrial Radio Access (UTRA) or CDMA2000. The TDMA may be implemented with a radio technology such as Global System for Mobile communications (GSM)/General Packet Radio Service (GPRS)/Enhanced Data Rates for GSM Evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink and employs the SC-FDMA in uplink. LTE-advance (LTE-A) is an evolution of the 3GPP LTE. For clarity, this application focuses on the 3GPP LTE/LTE-A. However, technical features of the present invention are not limited thereto. For example, although the following description will be made based on a mobile communication system corresponding to an 3GPP LTE/LTE-A system, the following description can be applied to other mobile communication systems except unique features of the 3GPP LTE/LTE-A system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a terminal equipment denotes a mobile or fixed type user terminal. Examples of the terminal equipment include various equipments that transmit and receive user data and/or various kinds of control information to and from a base station. The terminal equipment may be referred to as a user equipment (UE), a mobile station (MS), a mobile terminal (MT), a user terminal (UT), a subscriber station (SS), a wireless device, a personal digital assistant (PDA), a wireless modem, or a handheld device. Also, in the present invention, a base station (BS) means a fixed station that performs communication with a user equipment and/or another base station, and exchanges various kinds of data and control information with the user equipment and another base station. The base station may be referred to another terminology such as an evolved-NodeB (eNB), a base transceiver system (BTS), and an access point (AP).

A wireless communication system to which the embodiments of the present invention are applied includes a plurality of base stations. Each base station provides a communication service to user equipment(s) located in one or more specific local zones. The specific local zones are generally referred to as cells in the LTE/LTE-A system, and referred to as sectors in the IEEE 802.16. In IEEE 802.16, a local zone consisting of a plurality of sectors, which belong to one base station, is generally referred to as a cell.

Hereinafter, PDCCH/PCFICH/PHICH/PDSCH/DRS/CRS/DMRS/CSI-RS RE represents an RE assigned to or available for PDCCH/PCFICH/PHICH/PDSCH/DRS/CRS/DMRS/CSI-RS.

Meanwhile, in the present invention, if the specific signal is allocated to frame/subframe/slot/symbol/carrier/subcarrier, it means that the specific signal is transmitted through the corresponding carrier/subcarrier during a period/timing of the corresponding frame/subframe/slot/symbol.

Hereinafter, if a specific signal within frame/subframe/slot/symbol/carrier/subcarrier is not transmitted from its transmission location, it will be expressed that transmission of the specific signal has been dropped, muted, null or blanked.

Meanwhile, a UE implemented according to LTE standard will be referred to as LTE UE or legacy UE, and a UE implemented according to LTE-A standard will be referred to as LTE-A UE, advanced UE or evolved UE.

Meanwhile, if a specific signal is transmitted or muted with a certain period, the certain period is referred to as a duty cycle of the specific signal. Especially, if a specific signal is muted with a certain period, then the certain period is referred to as a muting cycle of the specific signal.

FIG. 1 is a block diagram illustrating a user equipment and a base station for implementing the present invention.

The user equipment (UE) serves as a transmitting apparatus on the uplink and as a receiving apparatus on the downlink. By contrast, the base station (BS) may serve as a receiving apparatus on the uplink and as a transmitting apparatus on the downlink.

The UE and the BS include antennas $500a$ and $500b$ for receiving information, data, signals, and/or messages, transmitters $100a$ and $100b$ for transmitting messages by controlling the antennas $500a$ and $500b$, receivers $300a$ and $300b$ for receiving messages by controlling the antennas $500a$ and $500b$, and memories $200a$ and $200b$ for storing information associated with communication in the wireless communication system. The UE and the BS further include processors $400a$ and $400b$, respectively, which are adapted to perform the present invention by controlling the components of the UE and the BS, such as the transmitters $100a$ and $100b$, the receivers $300a$ and $300b$, and the memories $200a$ and $200b$. The transmitter $100a$, the memory $200a$, the receiver $300a$, and the processor $400a$ in the UE may be configured as independent components by separate chips or their separate chips may be incorporated into a single chip. Likewise, the transmitter $100b$, the memory $200b$, the receiver $300b$, and the processor $400b$ in the BS may be configured as independent components on separate chips or their separate chips may be incorporated into a single chip. The transmitter and the receiver may be configured as a single transceiver in the UE or the BS.

The antennas $500a$ and $500b$ transmit signals generated from the transmitters $100a$ and $100b$ to the outside, or transfer radio signals received from the outside to the receivers $300a$ and $300b$. The antennas $500a$ and $500b$ can be referred as antenna ports. If the transmitters $100a$ and $100b$ and/or the receivers $300a$ and $300b$ support a Multiple Input Multiple Output (MIMO) function using a plurality of antennas, each of them may be connected to two or more antennas.

The processors $400a$ and $400b$ generally provide overall control to the modules of the UE and the BS. Especially, the processors $400a$ and $400b$ may carry out a control function for performing the present invention, a Medium Access Control (MAC) frame variable control function based on service characteristics and a propagation environment, a power saving mode function for controlling idle-mode operations, a handover function, and an authentication and encryption function. The processors $400a$ and $400b$ may also be referred to as controllers, microcontrollers, microprocessors, microcomputers, etc. The processors $400a$ and $400b$ may be achieved by hardware, firmware, software, or their combination. In a hardware configuration, the processors $400a$ and $400b$ may be provided with one or more Application Specific Integrated Circuits (ASICs), Digital Signal Processors (DSPs), Digital Signal Processing Devices (DSPDs), Programmable Logic Devices (PLDs), and/or Field Programmable Gate Arrays (FPGAs), for implementing the present invention. In a firmware or software configuration, firmware or software may be configured to include a module, a procedure, a function, etc. for performing functions or operations of the present invention. This firmware or software may be provided in the processors $400a$ and $400b$, or may be stored in the memories $200a$ and $200b$ and driven by the processors $400a$ and $400b$.

The transmitters $100a$ and $100b$ perform predetermined coding and modulation for signals and/or data, which are scheduled by schedulers connected with the processors $400a$ and $400b$ and transmitted to the outside, and then transfer the modulated signals and/or data to the antennas $500a$ and $500b$. For example, the transmitters $100a$ and $100b$ convert a transmission data stream to K layers by demultiplexing, channel coding, modulation, etc. The K layers are transmitted through the antennas $500a$ and $500b$ after being processed in transmission processors of the transmitters $100a$ and $100b$. The transmitters $100a$ and $100b$ and the receivers $300a$ and $300b$ of the UE and the BS may be configured in different manners depending on the procedures of processing transmitted signals and received signals.

Figure 2:
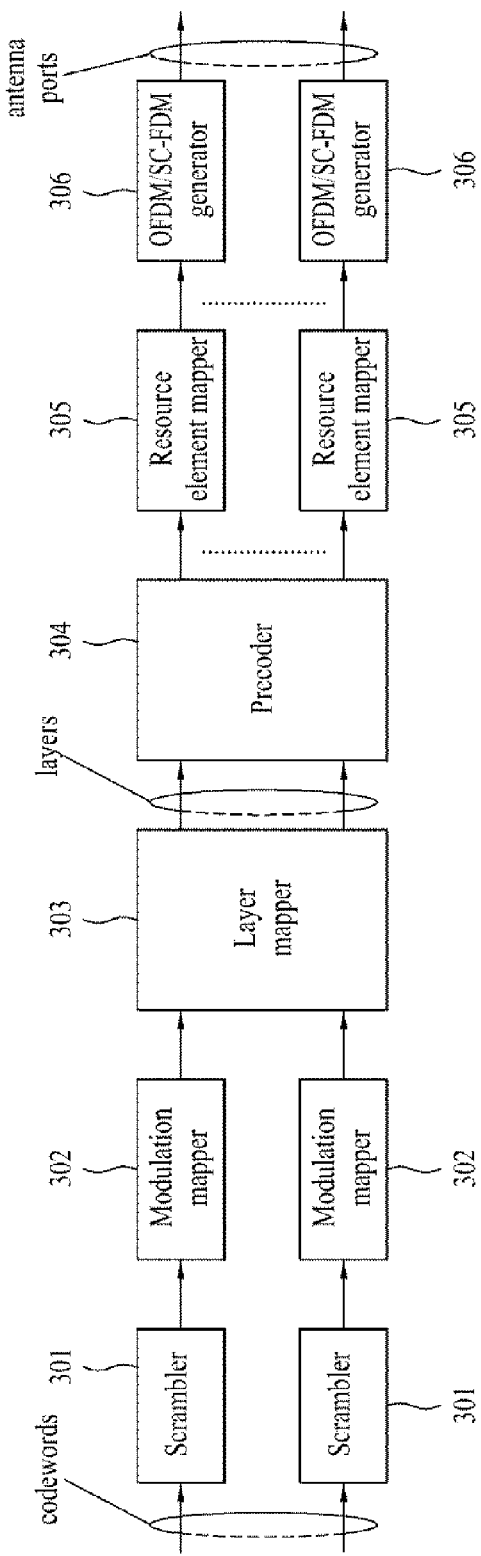
FIG. 2 is a block diagram illustrating an example of a transmitter in each of the UE and the BS.

FIG. 2 is a block diagram illustrating an example of a transmitter in each of the UE and the BS. Operations of the transmitters 100a and 100b will be described below in more detail with reference to FIG. 2.

Referring to FIG. 2, each of the transmitters 100a and 100b includes a scrambler 301, a modulation mapper 302, a layer mapper 303, a precoder 304, resource element mappers 305, OFDM/SC-FDM signal generators 306.

Each of the transmitters 100a and 100b can transmit more than one codewords. Coded bits in each codeword are scrambled by the scrambler 301 to be transmitted on a physical channel.

The scrambled bits are modulated by the modulation mapper 302 to generate complex-valued modulation symbols. The modulation mappers 302 modulate the scrambled bits to be arranged as complex-valued modulation symbols representing positions on a signal constellation in a predetermined modulation scheme. The modulation scheme may be, but not limited to, any of m-Phase Shift Keying (m-PKS) and m-Quadrature Amplitude Modulation (m-QAM).

The complex-valued modulation symbols are mapped onto one or several transmission layers by the layer mappers 303.

The complex-valued modulation symbols on each layer can be precoded by the precoder 304 for transmission on the antenna ports. A layer is also referred as stream. In other words, the precoder 304 maps the complex-valued modulation symbols to the antenna ports. Specifically, the precoder 304 multiplies the output x of the modulation mappers 303 by an $N_t \times M_t$ precoding matrix W. The output of the precoder 304 may be represented as an $N_t \times N_F$ matrix z.

The complex-valued modulation symbols for each antenna port are mapped/allocated to resource elements by the resource element mappers 305. The resource element mappers 305 can allocate the complex-valued modulation symbols for each antenna port to appropriate subcarriers and multiplex them according to users.

The OFDM/SC-FDM signal generators 306 generate complex-valued time domain Orthogonal Frequency Division Multiplexing (OFDM) signal or Single Carrier Frequency Division Multiplexing (SC-FDM) signal. In more detail, the OFDM/SC-FDM signal generators 306 output OFDM/SC-FDM symbols by modulating the complex-valued modulation symbols for each antenna port according to OFDM modulation scheme. For example, the OFDM/SC-FDM signal generators 306 may perform Inverse Fast Fourier Transform (IFFT) for the antenna-specific symbols and insert a Cyclic Prefix (CP) into the resulting IFFT time-domain symbol. The OFDM/SC-FDM symbol is transmitted to the receiving apparatus through the antenna ports.

If the transmitters 100a and 100b adopt SC-FDM Access (SC-FDMA) scheme for transmitting the codeword, each of the transmitters 100a and 100b includes fast Fourier transformer (not shown) and the fast Fourier transformer performs FFT to the complex-valued modulation symbols for each antenna and output the fast Fourier transformed symbols to the resource elements mappers 305.

The receivers 300a and 300b decode and demodulate radio signals received through the antennas 500a and 500b from the outside and transfer the demodulated signals to the processors 400a and 400b. The antenna 500a or 500b connected to each of the receivers 300a and 300b may include $N_r$ reception antennas. Signals received through the respective reception antennas are downconverted to baseband signals and recovered to an original data stream intended by the transmitter 100a or 100b, after multiplexing and channel demodulation. Therefore, each of the receivers 300a and 300b may have a signal recoverer for downconverting received signals to baseband signals, a multiplexer for multiplexing the baseband signals, and a channel demodulator for demodulating the multiplexed signal layers to a corresponding codeword. The signal recoverer, the multiplexer, and the channel demodulator may be configured as separate modules or incorporated into a single module.

Although it has been described in FIG. 1 and FIG. 2 that each of the transmitters 100a and 100b includes the scrambler 301, the modulation mappers 302, the layer mapper 303, the precoder 304, the resource element mappers 305 and the OFDMA/SC-FDM signal generators 306, the processors 400a and 400b of the transmitting apparatus may include the scrambler 301, the modulation mappers 302, the layer mapper 303, the precoder 304, the resource element mappers 305 and the OFDMA/SC-FDM signal generators 306. Likewise, although it has been described in FIG. 1 and FIG. 2 that each of the receivers 300a and 300b includes the signal recoverer, the multiplexer, and the channel demodulator, the processors 400a and 400b of the receiving apparatus may include the signal recoverer, the multiplexer, and the channel demodulator. Hereinafter, for convenience of description, the scrambler 301, the modulation mappers 302, the layer mapper 303, the precoder 304, the resource element mappers 305 and the OFDMA/SC-FDM signal generators 306 are included in the transmitters 100a and 100b separated from the processors 400a and 400b that control the operations of the scrambler 301, the modulation mappers 302, the layer mapper 303, the precoder 304, the resource element mappers 305 and the OFDMA/SC-FDM signal generators 306. And, the signal recoverer, the multiplexer, and the channel demodulator are included in the receivers 300a and 300b separated from the processors 400a and 400b that control the operations of the signal recoverer, the multiplexer, and the channel demodulator. However, the embodiments of the present invention can equally be applied to the case where the scrambler 301, the modulation mappers 302, the layer mapper 303, the precoder 304, the resource element mappers 305 and the OFDMA/SC-FDM signal generators 306 are included in the processors 400a and 400b and the case where the signal recoverer, the multiplexer, and the channel demodulator are included in the processors 400a and 400b.

The memories 200a and 200b may store programs required for signal processing and controlling of the processors 400a and 400b and temporarily store input and output information. Each of the memories 200a and 200b may be implemented into a flash memory-type storage medium, a hard disc-type storage medium, a multimedia card micro-type storage medium, a card-type memory (e.g. a Secure Digital (SD) or eXtreme Digital (XS) memory), a Random Access Memory (RAM), a Read-Only Memory (ROM), an Electrically Erasable Programmable Read-Only Memory (EEPROM), a Programmable Read-Only Memory (PROM), a magnetic memory, a magnetic disc, or an optical disk.

In the mean time, the processor 400b in the BS of the present invention allocate a specific data/control/reference signal to a frame/subframe/slot/symbol/carrier/subcarrier in accordance with the embodiments of the present invention, which will be described later, and controls the transmitter 100b to mute certain frequency/time resources within a frame/subframe/slot/symbol/carrier/subcarrier in accordance with the embodiments of the present invention.

Also, the processor 400a in the UE of the present invention can be configured to measure/estimate inter-cell interference and/or channel quality of a serving/neighboring cell in accordance with the embodiments of the present invention.

Figure 3:
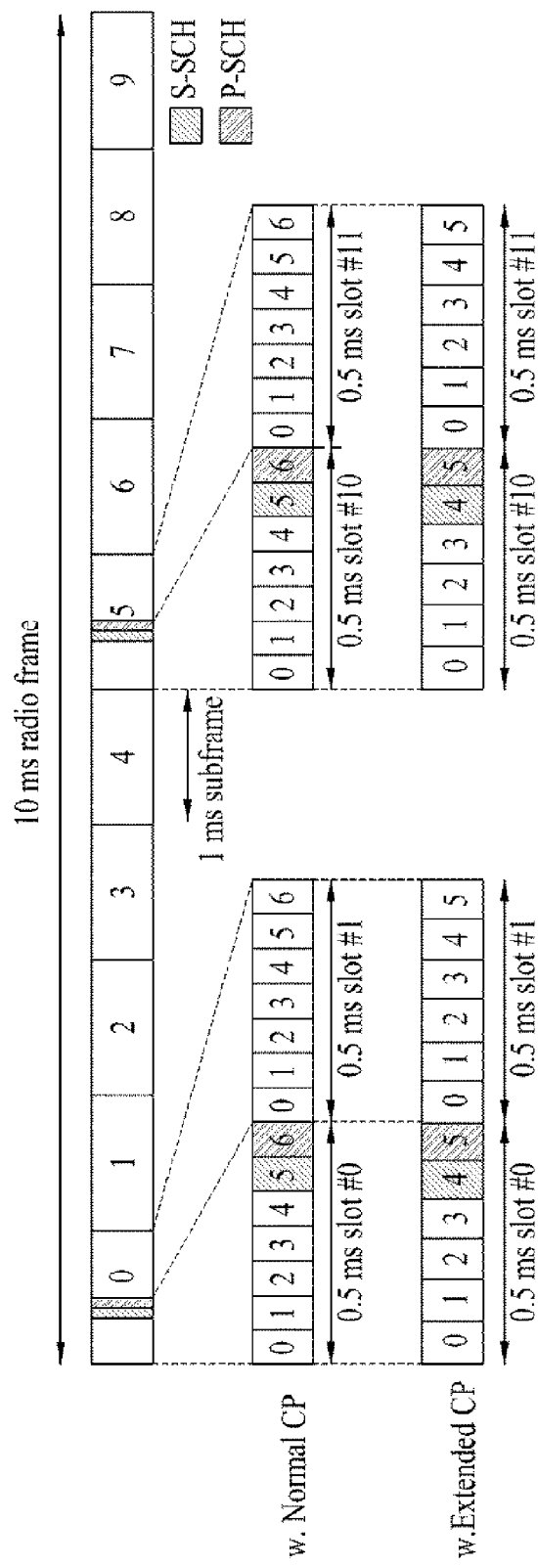
FIG. 3 illustrates an example of a structure of a radio frame used in the wireless communication system.

FIG. 3 illustrates an example of a structure of a radio frame used in the wireless communication system. Especially, FIG. 3 illustrates a structure of a radio frame of the 3GPP LTE/LTE-A system. The radio frame structure can be applied to a frequency division duplex (FDD) mode, a half frequency division duplex (H-FDD) mode, and a time division duplex (TDD) mode.

Referring to FIG. 3, the radio frame includes 10 subframes. A subframe includes two slots in time domain. A time for transmitting one subframe is defined as a transmission time interval (TTI). For example, one subframe may have a length of 1 millisecond (ms), and one slot may have a length of 0.5 ms.

Figure 4:
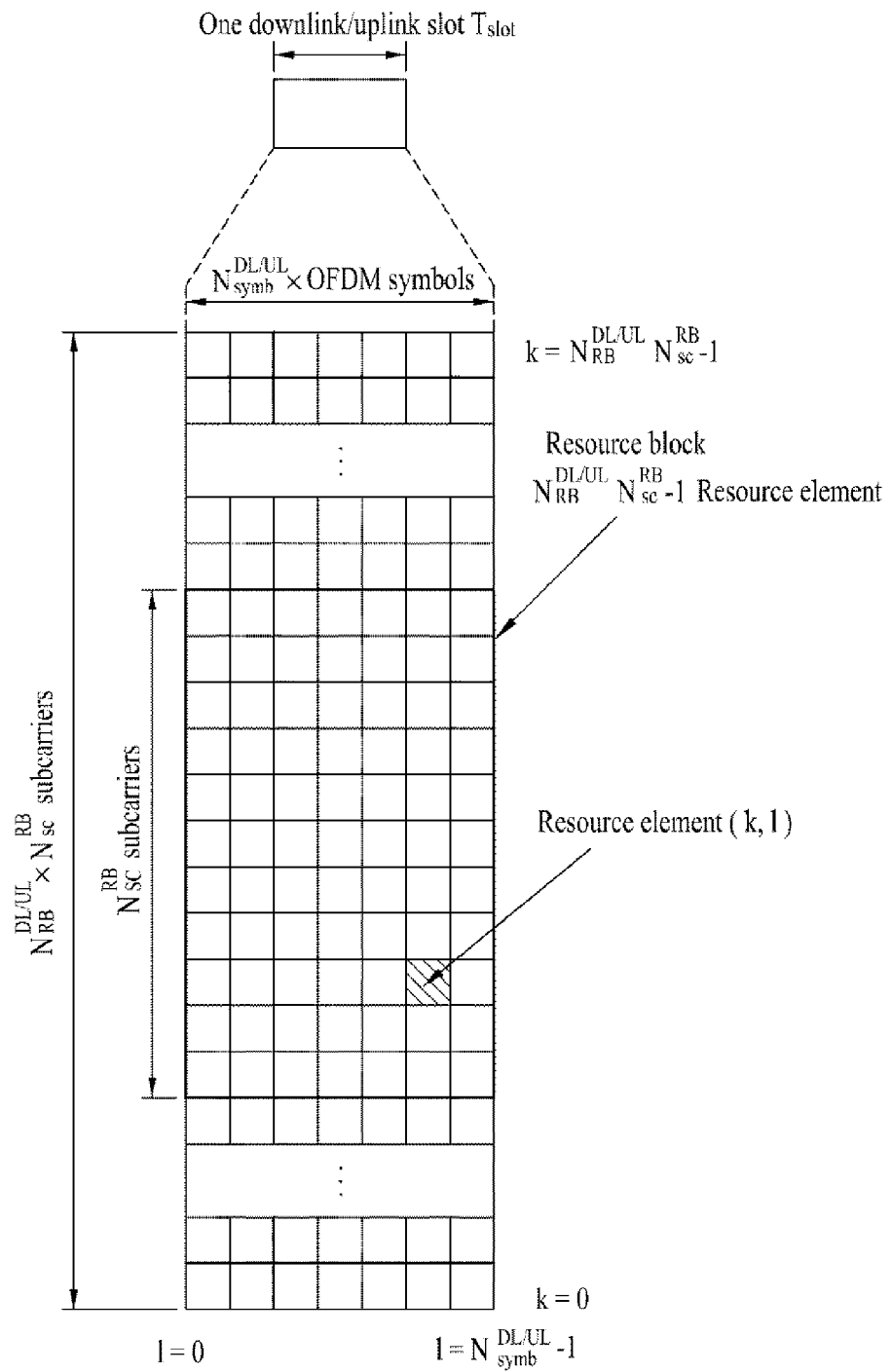
FIG. 4 illustrates an example of a structure of a downlink/uplink slot in the wireless communication system.

FIG. 4 illustrates an example of a structure of a downlink/uplink slot in the wireless communication system. Especially, FIG. 4 illustrates a structure of a resource grid of the 3GPP LTE/LTE-A system.

Referring to FIG. 4, one downlink/uplink slot includes a plurality of orthogonal frequency division multiplexing (OFDM) symbols in time domain, and includes a plurality of subcarriers in frequency domain. The OFDM symbol also represents one symbol period. The OFDM symbols may be referred to as OFDMA symbols or SC-FDMA symbols depending on a multiplexing access mode. The number of OFDMA symbols included in one slot can be varied depending on channel bandwidth and cyclic prefix (CP) length. A type of a slot or a subframe can be defined depending on the number of OFDM symbols included in the slot. For example, one slot includes seven OFDM symbols for a normal CP, and includes six symbols for an extended CP. One radio frame may include one type of slots or different types of slots. For convenience of description, a slot including seven OFDM symbols is mainly described in the embodiments of the present invention. However, the embodiments of the present invention, which will be described later, can be applied to other types of slots in the same manner.

In frequency domain, the OFDM symbol includes a plurality of subcarriers, and the number of subcarriers is determined depending on the size of FFT or IFFT. In frequency domain, resources can be grouped in a predetermined number of contiguous subcarriers in one slot. A group comprised of a predetermined number of subcarriers in one slot is referred to as a resource block (RB). One slot includes a plurality of RBs in frequency domain. The RB is a basic unit for resource allocation. The number of subcarriers within one RB may be 12, for example. In this case, the RB includes 7 OFDM symbols×12 subcarriers. A resource defined one symbol and one subcarrier is referred to as a resource element (RE). If a RB includes 7 OFDM symbols×12 subcarriers, it means that the RB includes 84 REs.

Referring to FIG. 4, a transmission signal in each slot can be described by one or several grids of $N^{DL/UL}_{RB}N^{RB}_{sc}$ subcarriers and $N^{DL/UL}_{symb}$ OFDM/SC-FDM symbols. There may be one resource grid per antenna port. The number of RBs, $N^{DL/UL}_{RB}$, included in one downlink/uplink slot depends on a downlink/uplink transmission bandwidth.

Each RE is uniquely defined by the index pair (k,l) in a slot where k=0, ..., $N^{DL/UL}_{RB}N^{RB}_{sc}-1$ and l=k=0, ..., $N^{DL/UL}_{symb}-1$ are the indices in the frequency and time domains, respectively. The REs can be classified into data RE for data transmission, reference signal RE for reference signal transmission and control RE for control information transmission.

Figure 5:
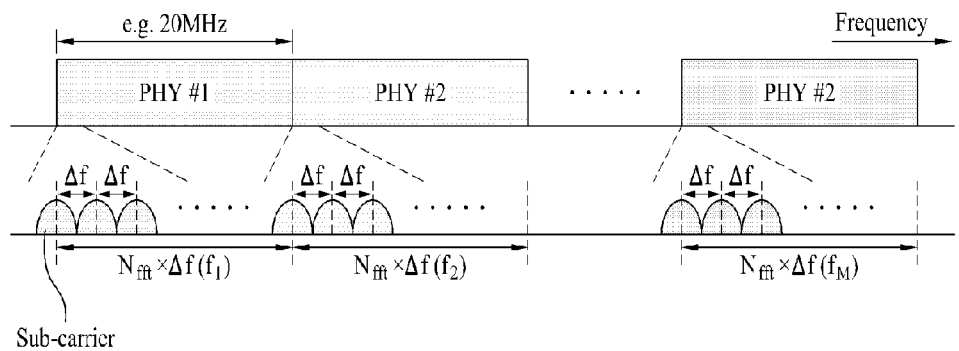
FIGS. 5 and 6 are conceptual diagrams for illustrating multiple component carrier system.
Figure 6:
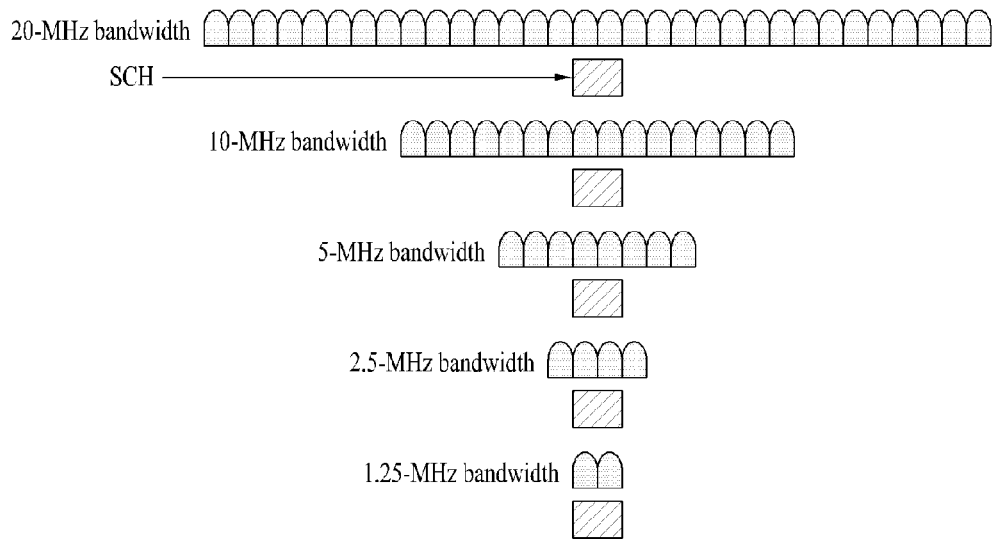

FIGS. 5 and 6 are conceptual diagrams for illustrating multiple component carrier system.

Referring to FIG. 5, multiple component carriers (PHY) can be used for supporting wider bandwidth. In FIG. 5, M component carriers are used for a single UE. Each component carriers has $N_{fft} \cdot \Delta f$ bandwidth size where $\Delta f$ denotes subcarrier spacing. In addition, the component carriers may have center frequency $f_i$, i=1, 2, ..., M, respectively. In this case, each center frequency can be regularly spaced and or irregularly spaced. Furthermore, each component carrier (PHY) can have uniform bandwidth or different bandwidth as illustrated in FIG. 6. The number of component carriers can be different according to UE and/or cell.

The aforementioned structure is only exemplary. Thus, various modifications can be made in the length of the radio frame, the number of subframes included in the radio frame, the number of OFDMA symbols included in the slot, and parameters of OFDMA symbols. For example, the number of RBs and the number of slots included in the radio frame can be varied depending on the channel bandwidth and the CP length.

Figure 7:
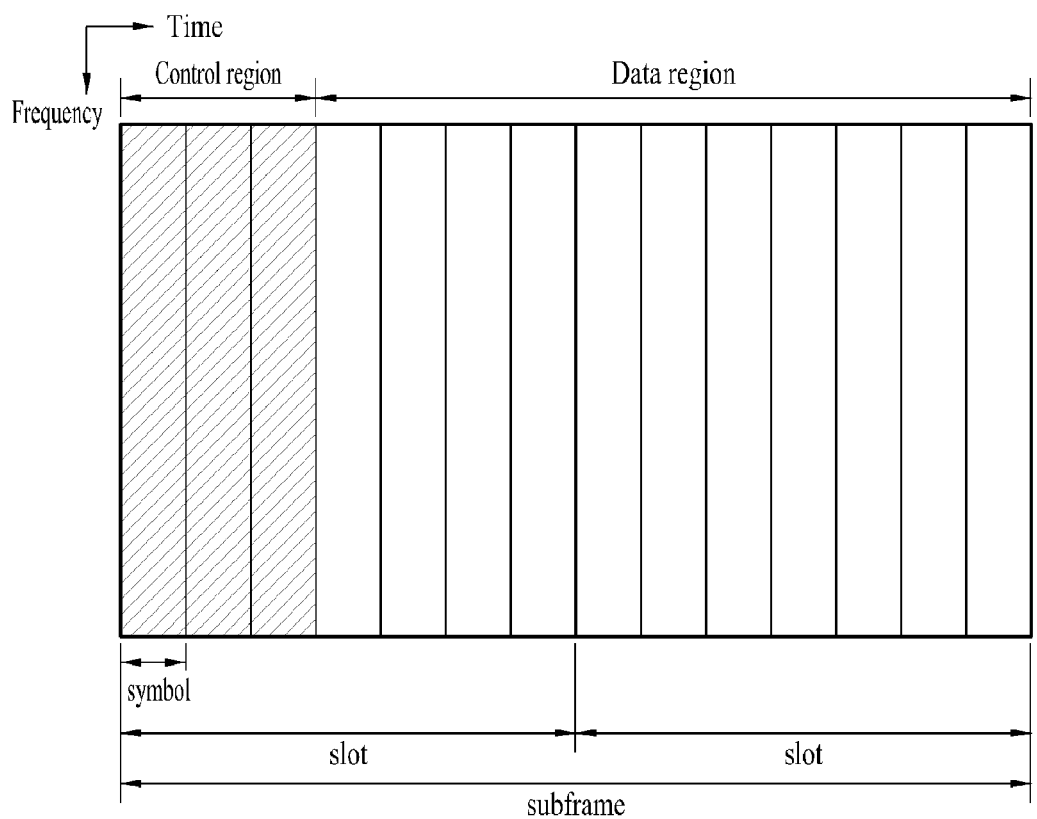
FIG. 7 illustrates an example of a structure of a downlink subframe in the wireless communication system.

FIG. 7 illustrates an example of a structure of a downlink subframe in the wireless communication system.

Referring to FIG. 7, a maximum of three OFDM symbols located in a front portion of the first slot within a subframe correspond to a control region to be assigned with a control channel. The remaining OFDM symbols correspond to a data region to be assigned to a physical downlink shared channel (PDSCH). For example, a physical control format indicator channel (PCFICH), a physical downlink control channel (PDCCH), a physical hybrid ARQ indicator channel (PHICH), etc can be allocated to the control region.

The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/not-acknowledgment (NACK) signal. Control information transmitted through the PDCCH is referred to as downlink control information (DCI). The DCI includes uplink or downlink scheduling information or includes an uplink transmit (Tx) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs.

The PDCCH can be used differently according to DCI format, usage and coding rate. For example, several DCI formats can be defined as follows.

TABLE 1

| DCI format | Objectives |
| --- | --- |
| 0 | Scheduling of PUSCH |
| 1 | Scheduling of one PDSCH codeword |
| 1A | Compact scheduling of one PDSCH codeword |
| 1B | Closed-loop single-rank transmission |
| 1C | Paging, RACH response and dynamic BCCH |
| 1D | MU-MIMO |
| 2 | Scheduling of rank-adapted closed-loop spatial multiplexing mode |
| 2A | Scheduling of rank-adapted open-loop spatial multiplexing mode |
| 3 | TPC commands for PUCCH and PUSCH with 2 bit power adjustments |
| 3A | TPC commands for PUCCH and PUSCH with single bit power adjustments |

The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). The structure of the REG will be described in detail with reference to FIG. 10. A format of the PDCCH and the number of bits of the available PDCCH are determined according to a correlation between the number of CCEs and the coding rate provided by the CCEs. The BS determines a PDCCH format according to a DCI to be transmitted to the UE, and attaches a cyclic redundancy check (CRC) to control information.

The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for system information (more specifically, a system information block (SIB) to be described below), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 8:
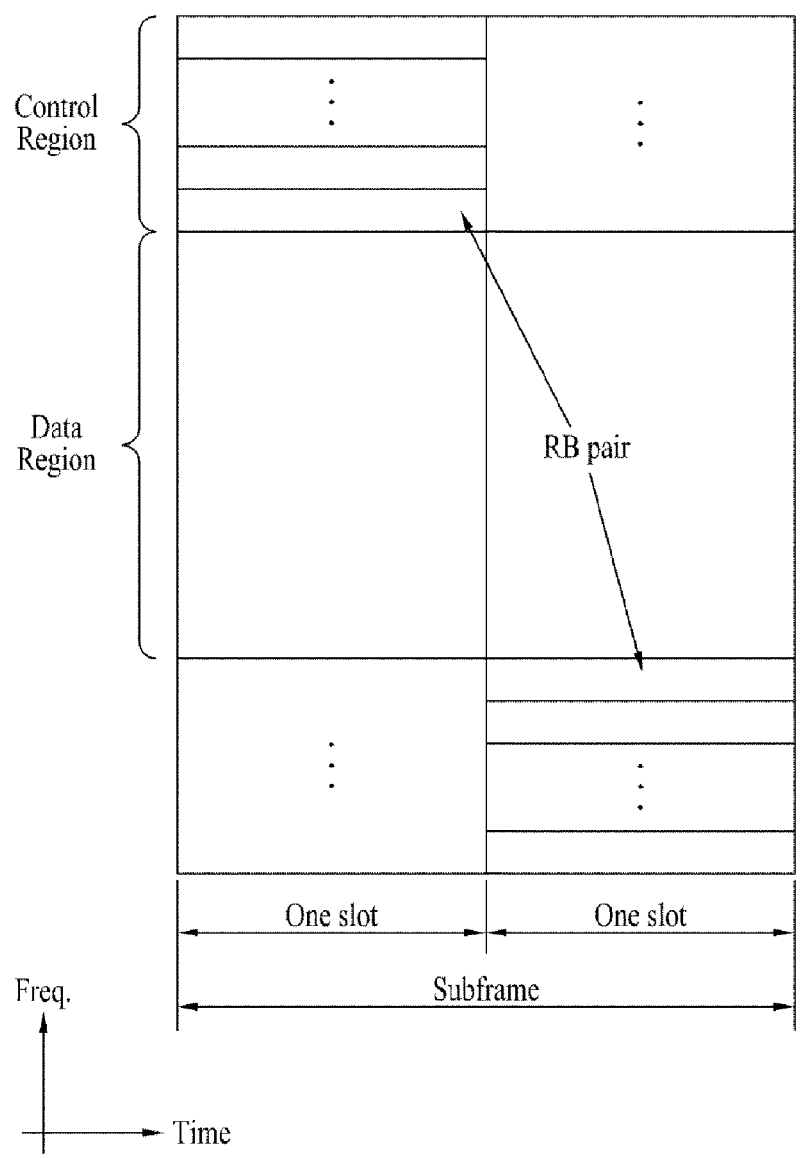
FIG. 8 illustrates an example of a structure of an uplink subframe in the wireless communication system.

FIG. 8 illustrates an example of a structure of an uplink subframe in the wireless communication system.

Referring to FIG. 8, an uplink subframe can be divided in a frequency domain into a control region and a data region. One or several physical uplink control channels (PUCCHs) can be allocated to the control region for carrying uplink control information (UCI). One or several physical uplink shared channels (PUSCHs) can be allocated to the data region for carrying user data. If a UE adopts SC-FDMA scheme for uplink transmission, the UE may not simultaneously transmit the PUCCH and the PUSCH for maintaining a single carrier property. The PUCCH for one UE is allocated to an RB pair in a subframe. RBs belonging to the RB pair occupy different subcarriers in respective two slots. This is called that the RB pair allocated to the PUCCH is frequency-hopped in a slot boundary.

In the mean time, synchronization signals can be transmitted on a radio frame. Referring to FIG. 3, a UE performs an initial cell search operation such as synchronization with a BS when power is turned on or the UE enters a new cell. The UE may receive a primary synchronization channel (P-SCH) and a secondary synchronization channel (S-SCH) from the BS, perform synchronization with the BS, acquire information such as a cell ID. If multiple component carriers are used for a single UE, the synchronization channels can be located regardless of the bandwidth size. The synchronization channels can be located in all component carriers or some specific component carriers. Also, the P-SCH and the S-SCH can be located in the same component carrier or different component carriers.

Figure 9:
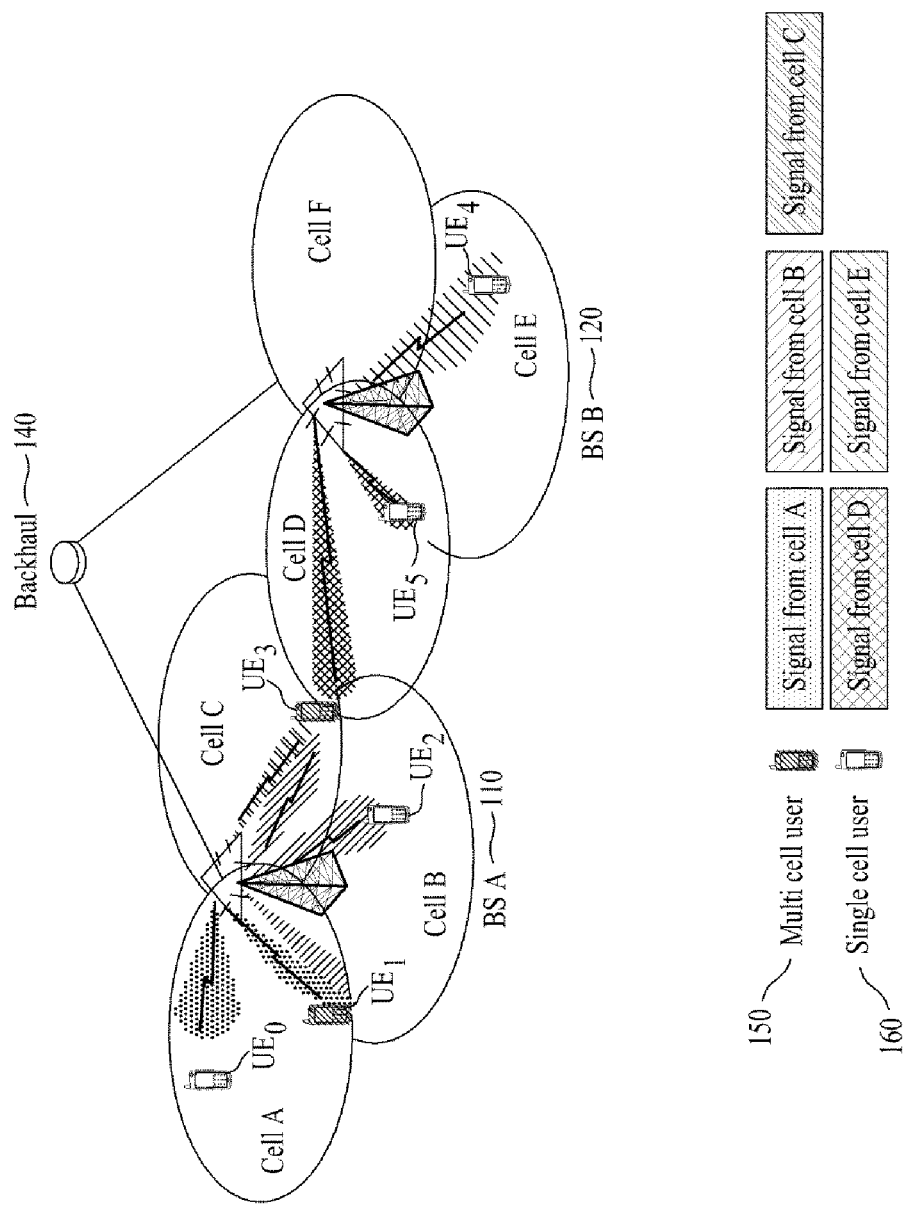
FIG. 9 is a conceptual diagram of a wireless communication system.

FIG. 9 is a conceptual diagram of a wireless communication system.

A wireless communication system to which the embodiments of the present invention are applied includes a plurality of base stations. Each base station (110, 120) provides a communication service to user equipment(s) in one or several cells (Cell A, Cell B, . . . , Cell F).

Cells belong to one BS can exchange information, for example, channel quality information, interference level, etc, via x2 interface. Cells belong to different BSs can exchange inter-cell information via backhaul (140).

A UE may communicate with one BS in one cell or communicate with multiple BSs in the border of several cells. Referring to FIG. 9, UE0 and UE2 which are single cell users (160) can communicate with BS A (110) through Cell A and Cell B, respectively, and UE4 and UE5 can communicate with BS B (120) through Cell E and Cell D, respectively. UE1 which is a multi cell user (150) can communicate with the BS A (110) through Cell A and Cell C, and UE3 which is a multicell user (150) can communicate with the BS B (120) through Cell D while communicating with the BS A (110) through Cell B and Cell C.

In a multi cell environment, it is necessary that the UE in a cell measure/estimate interference from the other cell(s) and channel quality/state of the serving cell and neighboring cell (s). Especially, interference from one or several neighboring BSs channel state of each BS influencing the UE should be measured/estimated with accuracy for mitigating inter-cell interference and for recovering reception appropriately.

In order to achieve accurate interference and/or channel quality measurement, the present invention suggests muting one or several REs in which a specific data, a control channel or a reference signal is to be assigned/transmitted. The accurate interference and/or channel quality measurement allows better channel adaptation according to the instantaneous channel condition. Hereinafter, schemes for allowing a UE to achieve accurate interference and/or channel quality measurement will be described.

1. First Scheme

To achieve accurate inter-cell interference measurement, a UE could have to receive signals from neighboring cell(s) without receiving signals from a serving cell. Accordingly, a specific data RE, a reference signal RE and/or control RE shall be muted. However, muting REs entails system throughput loss since a certain amount of downlink resource is wasted if how to mute REs is not properly designed. Therefore, a scheme for muting REs appropriately is necessary for allowing the UE to measure inter-cell interference with accuracy for a future wireless communication system.

Hereinafter, embodiments related to the first scheme for better inter-cell interference will be described.

1-1: RE Muting in PDCCH

For PDSCH transmission and uplink resource allocation, the PDCCH is normally used. The PDCCH can be transmitted in every frame irrespective of the subframe type. To allocate control information in a control region in each subframe, the resource is defined as illustrated in FIG. 10

Figure 10:
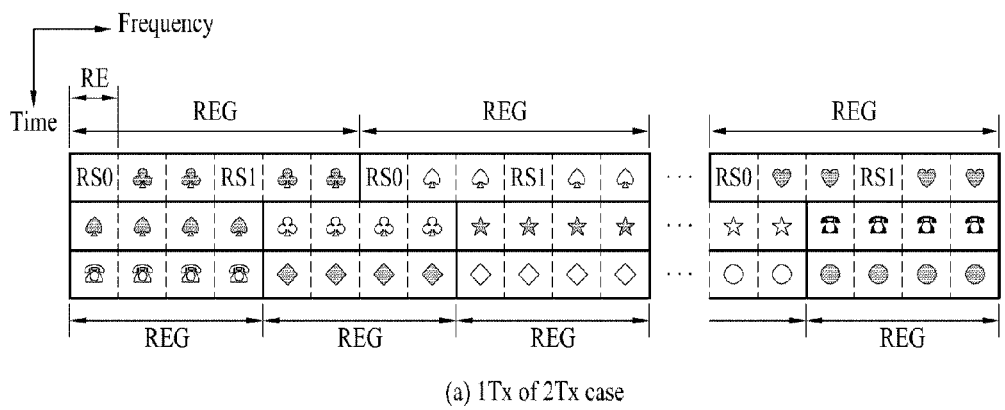
FIG. 10 illustrates examples of resource structures used for configuring a downlink control channel.

FIG. 10 illustrates examples of resource structures used for configuring a downlink control channel. Especially, FIG. 10(a) illustrates the case where the number of transmission antennas is 1 or 2 and FIG. 10(b) illustrates the case where the number of transmission antennas is 4. The resource structures in FIGS. 10(a) and 10(b) are different from each other in only an resource signal (RS) pattern according to the number of transmission antennas, but are equal to each other in a method of setting REs associated with the control channel.

Referring to FIG. 10, the REG which is the basic resource unit of the control channel is composed of four neighbor REs not assigned to RS(s). The REG is denoted by a solid line in the drawing. According to the control information to be transmitted, the number of REGs for the control information can be different. The PCFICH and the PHICH include four REGs and three REGs, respectively. The PDCCH is composed of CCE units and one CCE includes a plurality of REGs, for example, 9 REGs.

Figure 11:
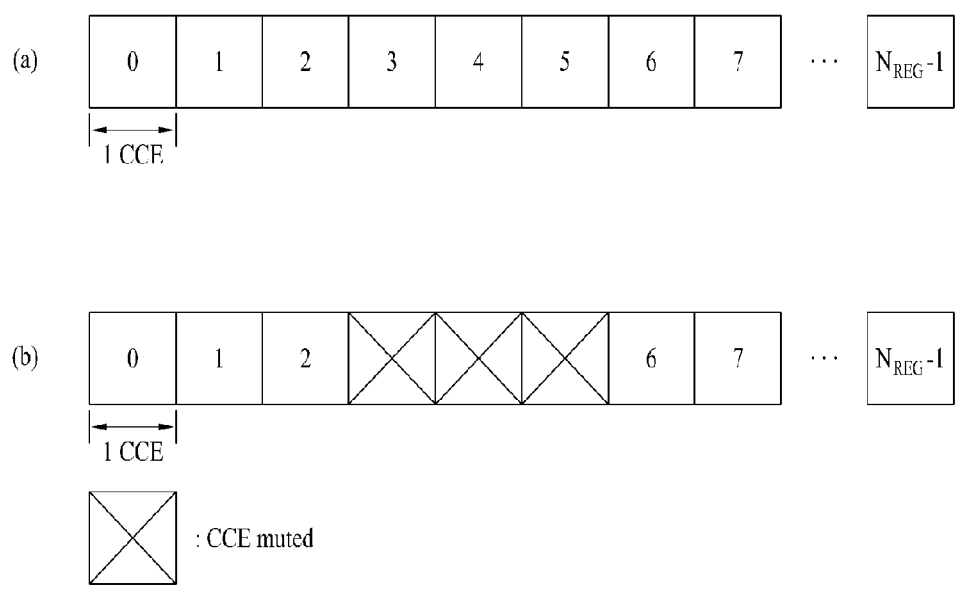
FIG. 11 illustrates an example of a set of CCEs available in a wireless communication system.

FIG. 11 illustrates an example of a set of CCEs available in a wireless communication system.

As mentioned before, the PDCCH is transmitted on an aggregation of one or several consecutive control channel elements (CCEs). The PDCCH region of each subframe to which one or more PDCCHs are assigned can be defined by one or several CCEs. The CCEs available in the system are numbered/indexed from 0 and $N_{CCE}-1$, where $N_{CCE}$ is defined as follows.

MathFigure 1

$$N_{CCE} = \lfloor N_{REG}/9 \rfloor \quad [\text{Math.1}]$$

In the Math FIG. 1, $N_{REG}$ is the number of REGs not assigned to PCFICH or PHICH.

The present invention provides embodiments which use the CCE for muting REs so that UEs can estimate inter-cell interference in the PDCCH region. According to these embodiments using CCEs for RE muting, interference measurement could become accurate since a CCE is well distributed in a frequency domain. Also, according to these embodiments using CCEs for RE muting, backward compatibility between LTE UE and LTE-A UE is still supported since the CCE being used for RE muting is not collide with other CCEs used for LTE and LTE-A UE. If a CCE is muted, no power is transmitted in the time/frequency resource mapped to the CCE.

These embodiments will be described in detail as follows.

(1) Bandwidth Dependent CCE Muting

The number of CCEs for muting can be different according to the bandwidth. In general, larger number of CCEs can be used for muting as the system bandwidth becomes wider. Accordingly, according to this embodiment, the more component carriers are used, the more CCEs get muted.

A BS according to this embodiment can signal, to a UE, information associated with the number of CCEs muted.

Since the number of CCEs for muting is dependent on the bandwidth, the number of CCEs can be predefined according to bandwidths. Accordingly, if the number of CCEs is predefined per bandwidth, a UE can recognize the number of CCEs by detecting a downlink bandwidth in a cell. A UE synchronized to a BS can receive broadcast information for the cell of the BS on a physical broadcast channel (PBCH). The PBCH carries a master information block (MIB), which consists of a limited number of the most frequently transmitted parameters essential for initial access to the cell. The MIB information includes the downlink system bandwidth, the PHICH configuration, the system frame number, etc. In this case, the BS may not transmit information indicating the number of CCEs being muted.

(2) Configurable CCE Muting

The number of CCE for muting can be configured by higher layer signaling. In addition, the CCE index can be also configured by higher layer signaling. In other words, the number of CCEs and which CCE is muted can be determined by higher layer.

A BS according to this embodiment transmits, to a UE, information indicating the number of CCEs and information indicating CCEs muted. Since the CCEs can be identified by their indices, the BS may transmit the index of the muted CCE as the information indicating the muted CCE. The UE can recognize how many CCEs are muted and where the muted CCEs exists.

(3) Predefined CCE Muting

The number of CCEs being muted and the CCEs being muted can be predefined. A BS always mutes the configured CCE in periodic manner so that a UE can estimate the interference in the muted CCE.

(4) Dynamic CCE Muting

Although the number of CCEs to be muted is predefined or configured in semi-static manner, the CCE to be muted can be dynamically changed from subframe to subframe. Therefore, the CCE index indicating a CCE muted actually can be broadcast in a specific PDCCH such as LTE-A common PDCCH. All the UEs in the BS's coverage can detect the specific PDCCH and recognize which CCE is actually muted in the subframe.

(5) CCE Hopping

The CCE being muted can be changed according to the time. The hopping pattern can be predefined by a cell ID and/or pseudo-random (PN) sequence. A UE can obtain the cell ID by using the synchronization channel aforementioned. Accordingly, the UE can recognize which CCE is actually muted. If the number of CCEs being muted is not predefined in the system, the BS can transmit information indicating the number of muted CCEs to the UE.

On the other hand, the hopping index can be decided by the combination of control format indicator (CFI) value, subframe number and/or system frame number. The CFI value indicates how many OFDM symbols are used for PDCCH transmissions in the subframe.

Table 2 shows the CFI in a PCFICH.

TABLE 2

| CFI | CFI codeword $<b_0, b_1, ---, b_{31}>$ |
|---|---|
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |
| 3 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 0> |
| 4 (reserved) | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |

CFI=1 indicates that downlink control information is only transmitted in the first OFDM symbol in a subframe, CFI=2 indicates that the downlink control information is transmitted in the first to second OFDM symbols, and CFI=3 indicates that the downlink control information is transmitted in the first to third OFDM symbols. Or the CFI information can be defined differently according to the system bandwidth. For example, if the system bandwidth is smaller than a specific threshold, it is possible to define that the CFI=1, 2 and 3 indicates that the downlink control information can be transmitted in the first to second OFDM symbols, the first to third OFDM symbols and the first to the fourth OFDM symbols, respectively.

The number of OFDM symbols used for PDCCH transmissions can vary in dynamic manner from subframe to subframe and this information can be indicated by PCFICH.

Figure 12:
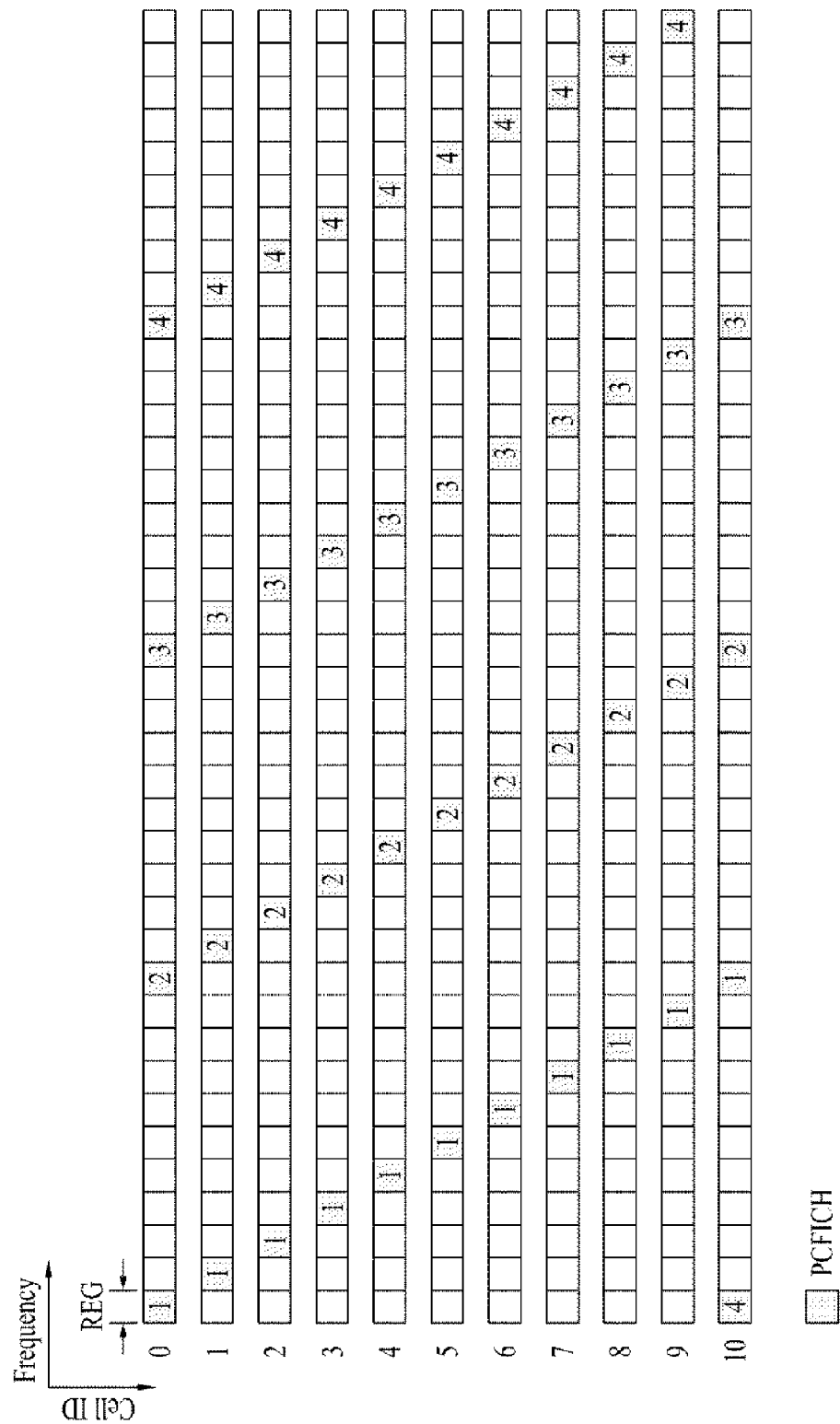
FIG. 12 illustrates examples of PCFICH according to cell IDs.

FIG. 12 illustrates examples of PCFICH according to cell IDs.

An REG in FIG. 12 contains 4 contiguous REs. The PCFICH is shifted in a frequency domain according to the cell-ID for avoiding inter-cell interference. The PCFICH is transmitted only in the first OFDM symbol so that a receiver (300a) can detect the PCFICH first and start blind detection for PDCCH.

(6) CFI Value Dependent CCE Muting

The number of CCE in a subframe can be dependent on the CFI value. If CFI=3, the largest number of CCEs can be used in that subframe if the bandwidth is 20 MHz. Therefore, this embodiment makes it possible that CCE muting can be activated or deactivated automatically according to the CFI value in a subframe. In case that a duty cycle is defined for CCE muting, the CCE muting is only activated in a subframe when the subframe is at the time designated by the duty for CCE muting. The CCE muting is only activated when the CFI value is larger than 2 or 3.

(7) RE Muting when CFI=4

The current LTE/LTE-A standard does not regulate CFI=4 value. In other words, according to the current LTE/LTE-A standard, a maximum of 3 OFDM symbols are available for PDCCH transmission. If LTE/LTE-A system can use 4th OFDM symbol for PDCCH transmission in a subframe, the legacy UE cannot receive PDCCH in that subframe. Therefore, any RE in the PDCCH region in that subframe can be muted for inter-cell interference measurement. A BS can transmit, to a UE, information indicating which RE is muted and/or how many REs are muted. The UE can recognize which resource is muted, and consider all the signals detected in that resource to be interference.

Besides, this embodiment can be combined with the embodiments (1) to (6) above. While CCEs located in the first OFDM symbol, the first to second OFDM symbols, or the first to third OFDM symbols can be muted in the above embodiments (1) to (6), CCEs located in the fourth OFDM symbol can be muted according to this embodiment.

A BS can mute a CCE according to one of the embodiments (1) to (7) above. The BS can transmit, to a UE in its coverage, information designating muted CCE(s). If CCE being muted is not predefined or the number of CCEs being muted is not predefined, the BS should have to transmit the information designating the muted CCE to the UE. However, if CCE being muted is predefined or the number of CCEs being muted is predefined, the BS may not transmit information associated with predefined one since the CCE being muted and/or the number of CCEs being muted is/are known value to the UE. If CCE being muted is defined according to a predefined specific rule, the BS may not transmit information designating the muted CCE since the UE could recognize/calculate the muted CCE according to the predefined specific rule.

Referring to FIG. 11(b), assuming that CCEs of which CCE indices are 4, 5 and 6 are muted in a subframe according to one of the embodiments (1) to (7) above, a BS can transmit the subframe with muting $CCE_3$ to $CCE_5$. $CCE_3$, $CCE_4$, $CCE_5$ denote CCEs of which indices are 3, 4 and 5, respectively. Hereinafter, $CCE_i$ denotes a CCE of which index is i.

The UE receives the subframe through a serving cell of the BS, and considers any signal received at the muted CCEs ($CCE_3$ to $CCE_5$) to be interference. Since a signal to be transmitted through a serving cell (hereinafter, serving signal) is muted in $CCE_3$ to $CCE_5$, the UE can measure the interference without the influence of the serving signal.

1-2. RE Muting in PHICH

A similar to RE muting in PDCCH, REs for PHICH transmission also can be used for inter-cell interference measurement purpose.

Figure 13:
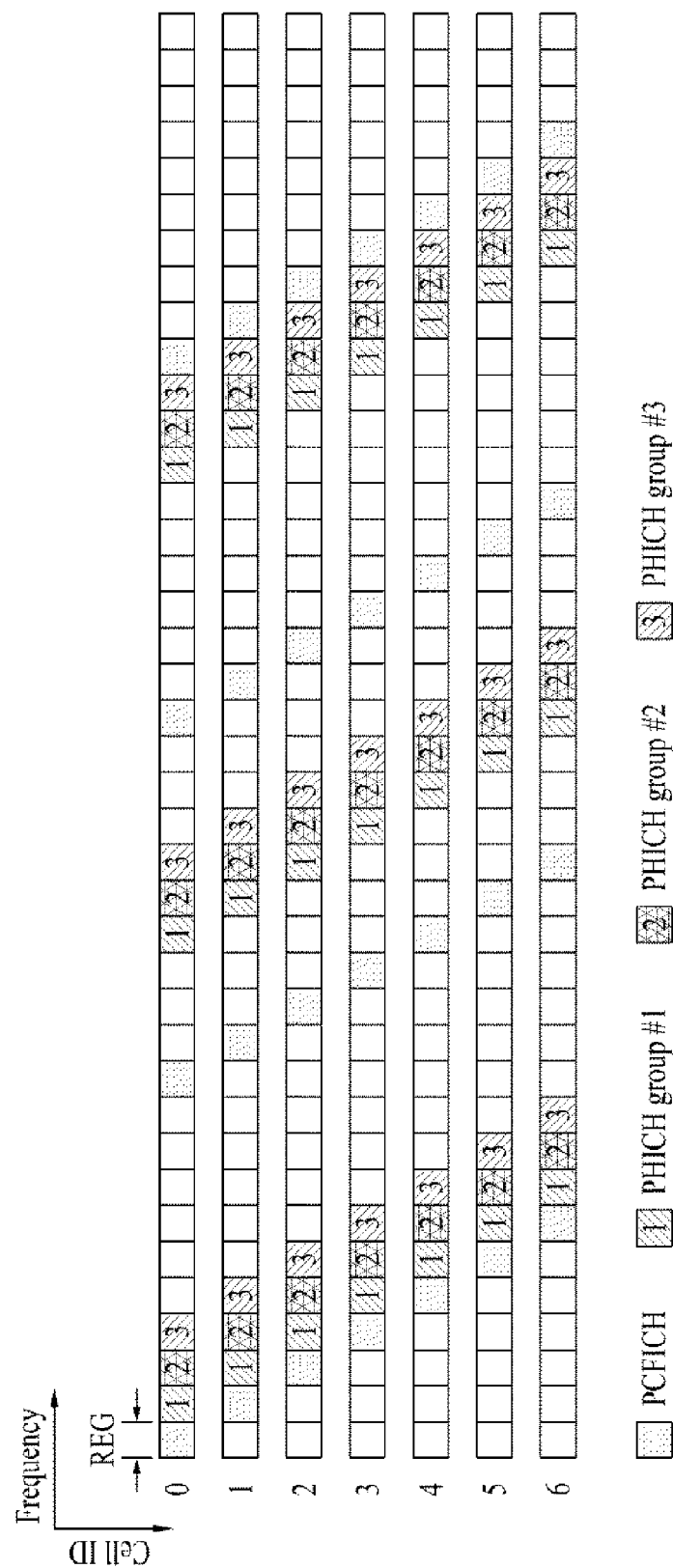
FIG. 13 illustrates examples of PCFICH/PHICH transmission under a specific system bandwidth.

FIG. 13 illustrates examples of PCFICH/PHICH transmission under a specific system bandwidth. The PHICH is used to transmit an HARQ ACK/NACK signal in response to a PUSCH transmission. That is, the PHICH refers to a channel used for transmitting DL ACK/NACK information for UL HARQ. The PHICH is composed of one REG and is scrambled cell-specifically. The ACK/NACK signal may be indicated by 1 bit and modulated using a Binary Phase Shift Keying (BPSK) scheme. The modulated ACK/NACK signal is spread using a Spreading Factor (SF) of 2 or 4. A plurality of PHICHs mapped to the same resources configures a PHICH group. The number of PHICHs multiplexed in one PHICH group is determined according to the number of spreading codes. The PHICH (group) is repeated three times in order to obtain a diversity gain in a frequency domain and/or a time domain.

The PHICH group allocation for ACK/NACK information transmission for a specific UE can be implicitly indicated by the lowest PRB index and the cyclic shift of demodulation reference signal (DMRS) in uplink grant. The PHICH resources are identified by an index pair ($n^{group}_{PHICH}, n^{seq}_{PHICH}$) where $n^{group}_{PHICH}$ is the PHICH group number/index and $n^{seq}_{PHICH}$ is the orthogonal sequence number/index within the group.

$n^{seq}_{PHICH}$ can be defined as follows:

TABLE 3

| Sequence index $n^{seq}_{PHICH}$ | Orthogonal sequence | |
|---|---|---|
| | Normal cyclic prefix $N^{PHICH}_{SF} = 4$ | Extended cyclic prefix $N^{PHICH}_{SF} = 2$ |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

$N^{PHICH}_{SF}$ is the spreading factor size used for PHICH modulation.

The $n^{group}_{PHICH}$ and $n^{seq}_{PHICH}$ can be defined as follows.

MathFigure 2

$$n^{group}_{PHICH} = (I_{PRB\_RA} + n_{DMRS}) \bmod N^{group}_{PHICH} + I_{PHICH} N^{group}_{PHICH}$$

$$n^{seq}_{PHICH} = (\lfloor I_{PRB\_RA}/N^{group}_{PHICH} \rfloor + n_{DMRS}) \bmod 2N^{PHICH}_{SF} \quad [\text{Math.2}]$$

In Math FIG. 2, $n_{DMRS}$ is mapped from the cyclic shift of the DMRS used in the uplink transmission with which the PHICH is associated. Mapping between $n_{DMRS}$ and the cyclic shift for the DMRS used in the associated uplink transmission can be defined as follows, for example.

TABLE 4

| Cyclic Shift for DMRS Field in PDCCH with uplink DCI format | $n_{DMRS}$ |
|---|---|
| 000 | 0 |
| 001 | 1 |
| 010 | 2 |
| 011 | 3 |
| 100 | 4 |
| 101 | 5 |
| 110 | 6 |
| 111 | 7 |

$N^{group}_{PHICH}$ is the number of PHICH groups configured by higher layers. $N^{group}_{PHICH}$ can be defined as follows.

MathFigure 3

$$N^{group}_{PHICH} = \begin{cases} \lceil N_g(N^{DL}_{RB})/8 \rceil & \text{for normal } CP \\ 2 \cdot \lceil N_g(N^{DL}_{RB})/8 \rceil & \text{for extended } CP \end{cases} \quad [\text{Math. 3}]$$

In Math FIG. 3, $N_g \in \{1/6, 1/2, 1, 2\}$ is provided higher layers and indicates 2 bits PHICH resource amount related information. $N_g$ can be transmitted in PBCH.

$I_{PRB\_RA}$ is the lowest index PRB of the uplink resource allocation. More specifically, $I_{PRB\_RA}$ can be $I^{lowest\_index}{}_{PRB\_RA}$ for the first transport block in the PDCCH with uplink DCI format and $I^{lowest\_index}{}_{PRB\_RA}+1$ for a first transport block in the PDCCH with uplink DCI format where $I^{lowest\_index}{}_{PRB\_RA}$ is the lowest PRB index in the first slot of the corresponding PUSCH transmission.

$I_{PHICH}$ is 1 for TDD uplink/downlink configuration 0 with PUSCH transmission in subframe n=4 or 9, and 0 otherwise.

The present invention provides an embodiment which uses a PHICH group for muting. A specific PHICH group can be muted in a subframe. Since the PHICH is well spread out to whole bandwidth, it would be possible to estimate accurate interference measurement although it harms backward compatibility. The PHICH group being muted can be determined differently according to cell IDs, or can be predefined. If a PHICH group being muted is not predefined, the BS transmits information designating the muted PHICH group to a UE necessarily. On the other hand, if always the same PHICH group is designated to be muted, the BS may not transmit the information designating the muted PHICH group.

Referring to FIG. 12, assuming that the PHICH group #1 is muted in a subframe according to this embodiment, a BS can transmit the subframe with muting the PHICH group #1. The UE receives the subframe through a serving cell of the BS, and considers any signal received at the PHICH group #1 to be interference. Since any ACK/NACK signal to be transmitted through a serving cell (hereinafter, serving signal) is muted in the PHICH group #1, the UE can measure the interference without the influence of the ACK/NACK signal.

1-3. RE Muting in PDSCH

REs for PDSCH transmission also can be muted in several manners as follows.

(1) Random PDSCH RE Muting

The PDSCH REs being muted can be randomly selected in an RB of a subframe and the same position in other RBs can be used for PDSCH transmission in the subframe. For the random selection, PN sequence generator with or without cell ID initiation can be used to randomize interference. However, it is preferable that the random selection is defined in cell-specific manner so that it is time invariant in a cell point of view.

(2) Subband Based Muting

The RE muting can be performed in a specific frequency region such as a physical resource block (PRB) per subband. Since the RE muting harms legacy UE (LTE UE) performance, it would be better to minimize the number of RB containing a muted RE.

(3) Configured RB Based Muting

It is possible that specific RB(s) only in a subframe have muted RE(s). However, the exact RB(s) having a muted RE can be configured in higher layer signaling and/or PDCCH so that scheduling flexibility can be maintained with RE muting. In this case, a BS transmits information indicating the muted RB to a UE. Or the RB being muted can be implicitly determined based on other parameter known to both the BS and the UE. If a UE can obtain implicitly or explicitly the muted RE without the information indicating the muted RE, the BS may not transmit information specifying the muted RE.

In the mean time, in the embodiments of the first scheme, the RE muting position can be the REs for channel state information RS (CSI-RS) transmission in neighboring cell if the RE is not collided with the CSI-RS position in the serving cell.

1-4. Muting Zone

In the mean time, in order to minimize an effect on the system due to RE muting, according to the present invention, the RE muting can be performed on only predetermined certain number of radio frame(s) or subframe(s) not all radio frames and subframes. Hereinafter, an interval where one BS mutes REs for a user equipment will be referred to as a muting zone. In other words, the muting zone can be defined to mute REs for UE's interference measurement. The muting zone configured in accordance with the embodiments of the present invention. The present invention includes an embodiment that the muting zone spans one radio frame or one subframes and another embodiment that the muting zone spans a plurality of contiguous radio frames or a plurality of contiguous subframes. The present invention further includes an embodiment that the number of radio frames constituting a muting zone is fixed and an embodiment that the number of radio frames or subframes constituting a muting zone is not fixed.

If the number of radio frames constituting a muting zone is not fixed, the base station can signal the number of radio frames or subframes constituting the muting zone to the user equipment. Even in the case that the number of radio frames or subframes that belong to the muting zone is fixed, information on the number of radio frames or subframes that belong to the LBS zone can be signaled to the user equipment. The processor 400b of the base station can generate information indicating the number of radio frames or subframes, and control the transmitter 100b to transmit the generated information.

In this respect, a UE should know a radio frame or a subframe belonging to a muting zone among a plurality of radio frames received from a BS. Accordingly, the BS can transmit information indicating a radio frame or a subframe belonging to the muting zone to the UE. For example, the base station can signal information indicating that the muting zone has been activated, to the UE. To this end, the processor 400b of the BS can generate information indicating that the LBS zone has been enabled. Also, the processor 400b can control the transmitter 100b of the BS to transmit the generated information to the user equipment. The receiver 300a of the UE receives the information and transfers it to the processor 400a of the UE. The processor 400a of the UE can identify the location of the muting zone and/or whether the muting zone has been activated, based on the information.

In the mean time, the muting zone can be configured periodically. In this case, the BS may not transmit the information indicating that the muting zone has been activated, separately. If the LBS zone can be transmitted at any one of various transmission periods, information indicating the transmission period may be transmitted to the UE. To this end, the processor 400b of the BS generates the information to indicate the muting zone transmission period, and control the transmitter 100b of the BS to transmit the information to the UE. The receiver 300a of the UE receives the information, and the processor 400a of the UE can identify the muting zone based on the information. In other words, if the information indicating the transmission period of the muting zone is signaled to the UE, the UE can identify that the muting zone is activated per corresponding period. If the transmission period of the muting zone is fixed to only one value, the information indicating the transmission period of the muting zone may not be signaled to the UE.

The embodiments of 1-4 can be applied to any one of the embodiments 1-1 to 1-3.

A BS can transmit a subframe with muting RE(s) according to one of the embodiments described in 1-1 to 1-4. To this end, a processor 400b of the BS can assign no power in frequency/time resource corresponding to the RE(s) being muted according to one of the embodiments described in 1-1 to 1-4. A transmitter 100b of the BS can transmit the subframe with muting the RE(s) under control of the transmitter 100b of the BS.

The UE receives the subframe through a serving cell of the BS, and considers any signal received at the muted RE to be interference. Since a signal to be transmitted through a serving cell (hereinafter, serving signal) is muted in the muted RE, the UE can measure the interference without the influence of the serving signal. The processor 400a of the UE can measure/estimate a signal received at the muted RE(s), and consider the measured/estimated value to be interference by other cell(s).

According to the embodiments of the first scheme of the present invention, accurate inter-cell interference measurement can be achieved by using RE muting in which a specific data RE and/or control channel RE is intensively not transmitted, thereby allowing estimating other cell interference without a signal of a serving cell.

2. Second Scheme

For estimating channel state/quality, various reference signals are used. The reference signals can be classified to dedicated reference signal (DRS) and common reference signal (CRS). For the DRS and CRS, different terminologies can be used such as demodulation RS and cell-specific reference signal, respectively.

Figure 14:
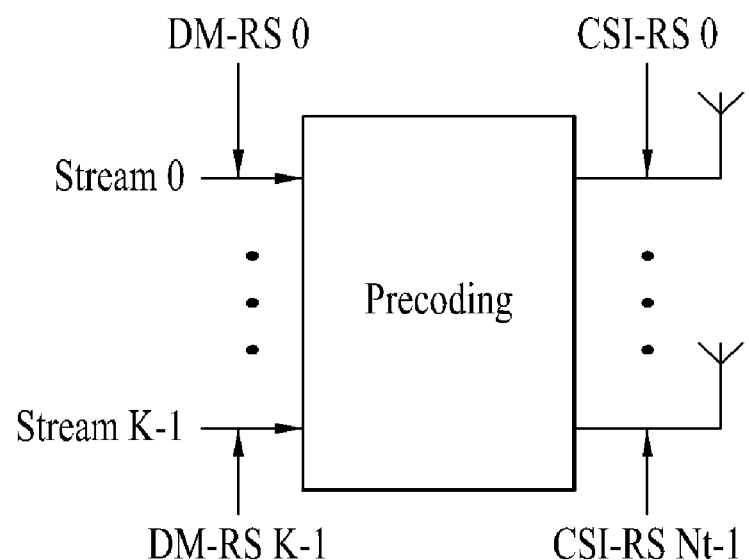
FIG. 14 is a conceptual diagram of a DRS transmission.

FIG. 14 is a conceptual diagram of a DRS transmission. Especially, FIG. 14 illustrates a transmitter transmitting a precoded RS.

The DRS is only used for a specific UE and the other UE cannot use this RS. The DRS is normally used for demodulation purpose and it can be classified to a precoded RS and a non-precoded RS.

Referring to FIG. 14, if the precoded RS is employed as a DRS, the RS is also precoded with a precoding matrix which is used for data symbol and the same number of RS sequences corresponding to a number of layers K is transmitted. Here, K is equal to or smaller than the number of antenna ports $N_t$. The K layers can be allocated to either one UE or multiple UEs. If multiple UEs share the K layers, 1 to K UEs share the same time/frequency resources at the same time.

Figure 15:
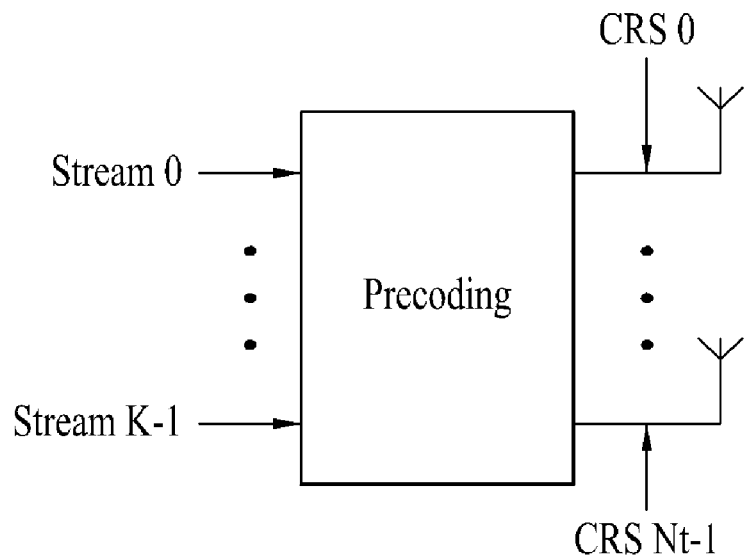
FIG. 15 is a conceptual diagram of a CRS transmission.

FIG. 15 is a conceptual diagram of a CRS transmission.

The CRS can be used for both demodulation and measurement purpose and it is shared by all UEs in a cell. In this case, the RS should not be encoded with precoder at a transmitter as shown in FIG. 15 since the precoder normally is used for a specific UE. However, if there is a cell-specific precoder in a specific system, it is not regarded as a precoder but virtualization. In this case, although the CRS is precoded at the transmitter, the RS is not regarded as a precoded CRS. CRS sequences should be transmitted for all antenna ports irrespective of the number of layers.

RS Structure in LTE (3GPP Rel-8 and Rel-9) system

Figure 16:
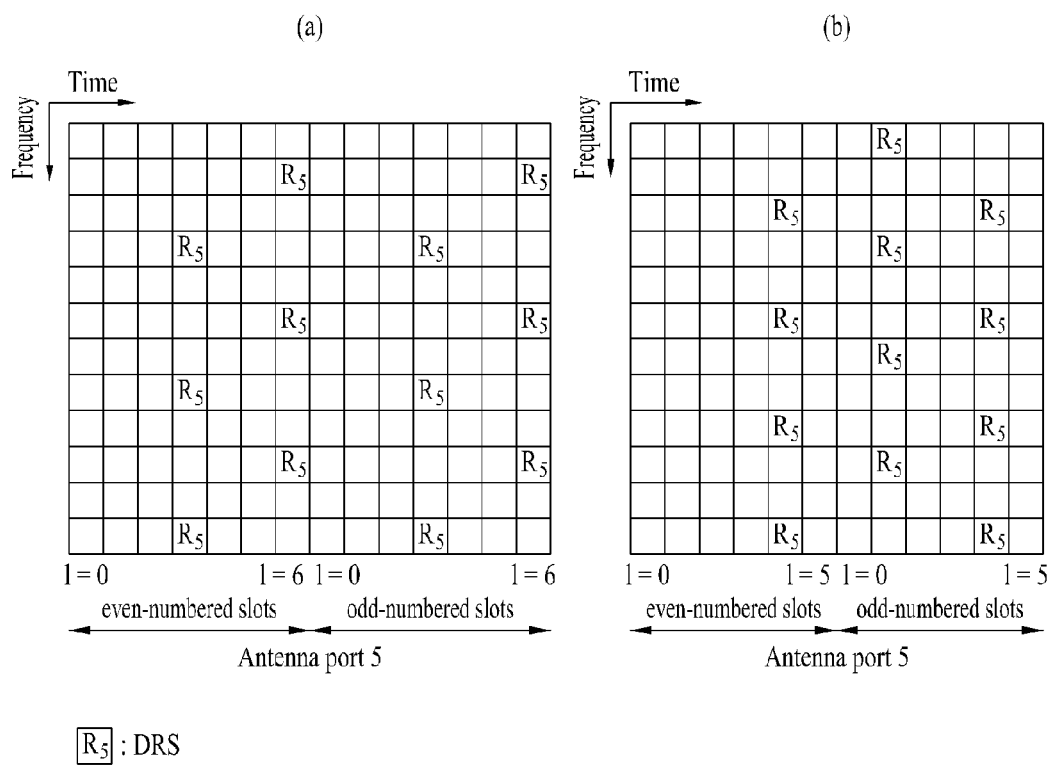
FIG. 16 illustrates examples of DRS patterns being used in an LTE system.

FIG. 16 illustrates examples of DRS patterns being used in LTE system. Especially, FIG. 16(a) illustrates a DRS pattern in a normal CP subframe, and FIG. 16(b) illustrates an example of DRS pattern in an extended CP subframe. In FIG. 16, 'l' denotes OFDM symbol position in a slot.

In the mean time, the LTE system only supports a maximum of one layer and the layer should be transmitted with CRS at the same time. Therefore, if DRS(s) are transmitted with CRS, RS overhead would be seriously high as compared with that of CRS only transmission.

Figure 17:
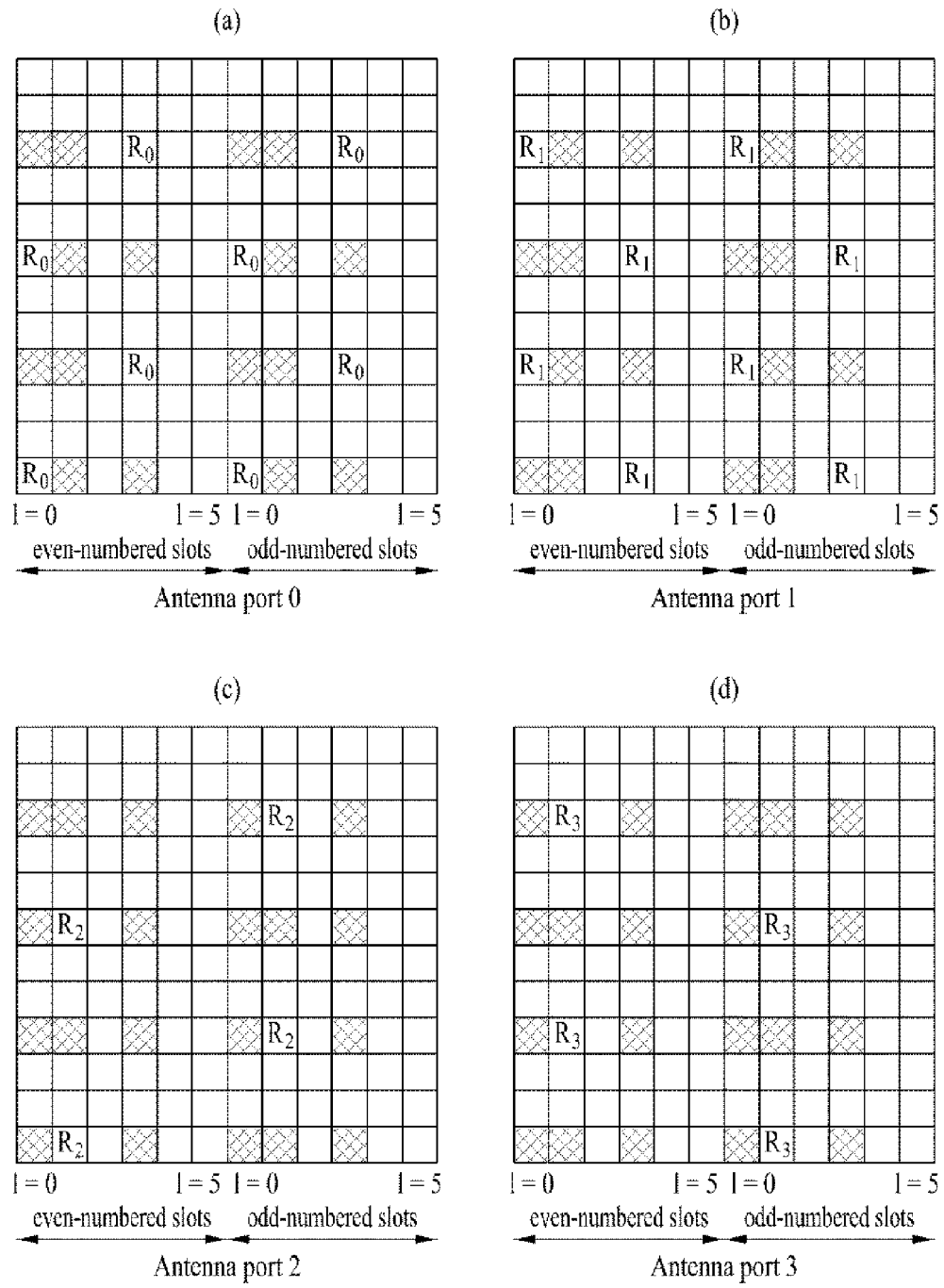
FIG. 17 illustrates examples of CRS patterns according to antenna ports.

FIG. 17 illustrates examples of CRS patterns according to antenna ports.

CRSs are transmitted in all downlink subframes in a cell supporting PDSCH transmission. Referring to FIG. 17, the CRS patterns for each antenna ports are mutually orthogonal in time/frequency domain.

If a transmitter has one antenna port then the antenna port transmits the CRS pattern for antenna port 0. If 4Tx MIMO transmission is employed in LTE downlink, the CRSs for antenna port 0~3 are used at the same time. To minimize interference between RS signals, when a certain antenna port transmits its CRS, the certain antenna port does not transmits a signal at the REs in which CRSs for the other antenna ports are transmitted.

In the meantime, a predefined sequence (e.g., Pseudo-random (PN), m-sequence and etc.) can be multiplied with an RS so as to minimize inter-cell interference, thus increasing channel estimation performance. The PN sequence is applied in OFDM symbol level in a subframe and the sequence can be defined according to the cell-ID, the subframe number and the position of OFDM symbol. For example, referring to FIG. 17(a), the number of RS for an antenna port is two in an OFDM symbol having RS in an RB and the number of RBs in LTE system can be from 6 to 110. Therefore, the total number of CRSs for an antenna port in an OFDM symbol having RS(s) can be $2 \times N_{RB}$. This implies that the sequence length should be $2 \times N_{RB}$. Here, $N_{RB}$ denotes number of RBs corresponding to a (downlink) bandwidth and the sequence can be binary or complex.

The CRS sequence may be defined by

MathFigure 4

$$r_{l,n_s}(m) = \frac{1}{\sqrt{2}}(1 - 2 \cdot c(2m)) + j\frac{1}{\sqrt{2}}(1 - 2 \cdot c(2m+1)) \quad \text{[Math. 4]}$$

where $m = 0, 1, \ldots, N_{RB}^{max,DL} - 1$, where $n_s$ is the slot number within a radio frame and l is the OFDM symbol number within the slot and $N_{RB}^{max,DL}$ denotes the number of RBs corresponding to the maximum downlink bandwidth in LTE system. Thus $N_{RB}^{max,DL}$ could be 110 as mentioned above.

The DRS sequence may be defined by

MathFigure 5

$$r_{n_s}(m) = \frac{1}{\sqrt{2}}(1 - 2 \cdot c(2m)) + j\frac{1}{\sqrt{2}}(1 - 2 \cdot c(2m+1)) \quad \text{[Math. 5]}$$

where $m = 0, 1, \ldots, N_{RB}^{PDSCH} - 1$, where $N_{RB}^{PDSCH}$ denotes the bandwidth in resource blocks of the corresponding PDSCH transmission.

The pseudo-random (PN) sequence c(n) in Math FIGS. 4 and 5 may can be defined by a length-31 Gold sequence as follows. The output sequence c(n) of length $M_{PN}$ where n=0, 1, . . . , M, may be defined by MathFigure 6

$c(n)=(x_1(n+N_c)+x_2(n+N_c)) \bmod 2 x_1(n+31)=(x_1(n+3)+x_1(n)) \bmod 2 x_2(n+31)=(x_2(n+3)+x_2(n+2)+x_2(n+1)+x_2(n)) \bmod 2$,  [Math.6]

where $N_C=1600$ and the first m-sequence shall be initialized with $x_1(0)=1, x_1(n)=0, n=1, 2, \ldots, 30$. The initialization of the second m-sequence may be denoted by MathFigure 7

$c_{init}=\Sigma_{i=0}^{30} x_2(i) \cdot 2^i$  [Math.7]

with the value depending on the application of the sequence.

RS Structure in LTE-A (3GPP Rel-10~) System

To reduce the overall RS overhead, a DRS-based downlink transmission is used in LTE-A system. Since the CRS-based downlink transmission always need to transmit the CRSs for all physical antenna ports, the DRS-based downlink transmission may reduce the RS overhead considering the fact that only virtual antenna port needs RS.

Accordingly, in LTE-A system, DRSs which can be also referred as UE-specific RSs are supported for transmission of PDSCH and are transmitted on antenna port(s) p=5, p=7, p=8 or p=7, 8, . . . , v+6, where v is the number of layers used for transmission of the PDSCH. The DRS for antenna port 5in LTE-A system corresponds to the DRS of LTE system. The DRSs are transmitted only on the resource blocks upon which the corresponding PDSCH is mapped. For antenna port 5, DRS sequence may be defined by Math FIG. 5. For any of the antenna ports p∈{7, 8, . . . , v+6}, the RS sequence may be defined by MathFigure 8

$$r(m) = \frac{1}{\sqrt{2}}(1 - 2 \cdot c(2m)) + j\frac{1}{\sqrt{2}}(1 - 2 \cdot c(2m+1))$$ [Math. 8]

where $m = 0, 1, \ldots, N_{RB}^{max,DL} - 1$

Figure 18:
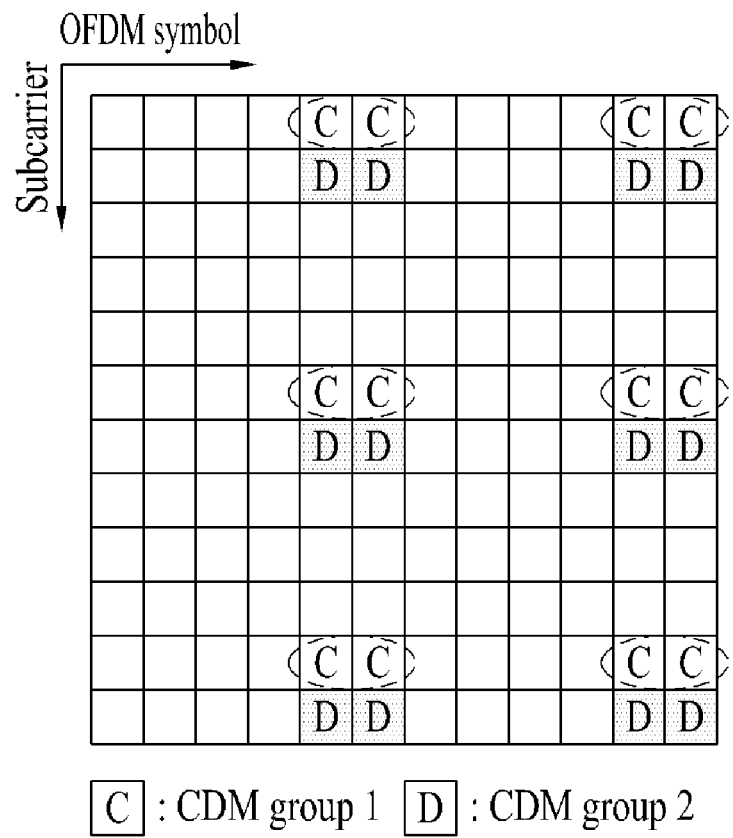
FIG. 18 illustrates an example of DRS patterns in an LTE-A system.

FIG. 18 illustrates an example of DRS patterns in an LTE-A system. Especially, FIG. 18 illustrates DRS patterns of LTE-A system in a physical resource block (PRB) for a normal CP subframe where the DRS patterns supports up to 4 layers.

Referring to FIG. 18, two code division multiplexing (CDM) groups are used for multiplexing 2 layers in each CDM group so that a maximum of 4 layers can be multiplexed in this pattern. For the CDM multiplexing, 2×2 Walsh spreading or 4×4 Walsh spreading can be used.

Figure 19:
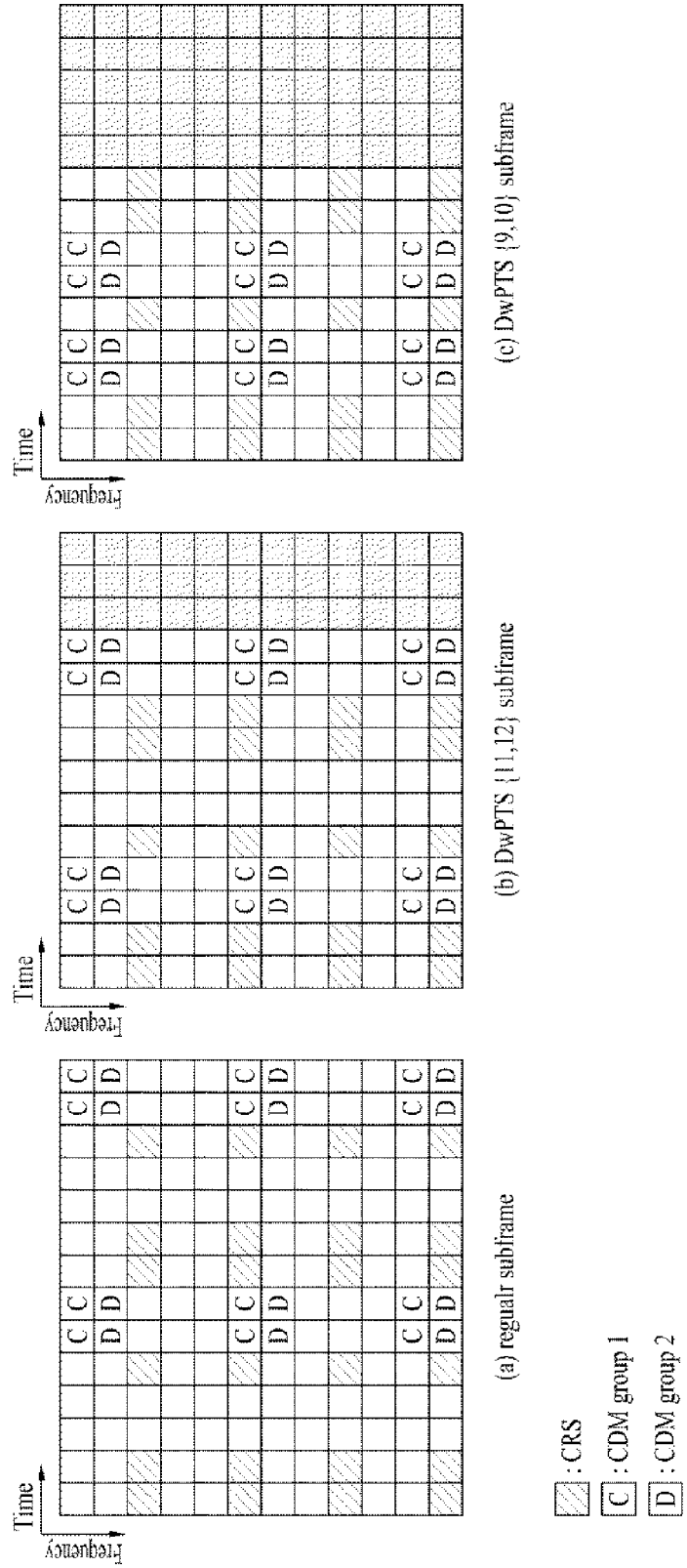
FIG. 19 illustrates examples of a regular subframe and special subframes in which DRSs of LTE-A system and CRSs of LTE system are transmitted.

FIG. 19 illustrates examples of a regular subframe and special subframes in which DRSs of LTE-A system and CRSs of LTE system are transmitted.

Special subframes include guard period (GP) in addition to seven OFDM symbols (for normal CP) or six OFDM symbols (for extended CP). The subframes excluding the GP can be referred to as regular subframes. Referring to FIG. 19, in LTE-A system, the CRS can be transmitted for the purpose of supporting LTE UEs.

In the meantime, the DRS is only allowed to use for demodulation purpose so that another RS should be transmitted for channel state/quality measurement. Accordingly, an RS for feed baking channel state information to a BS should be transmitted as well as DRS so that a UE can estimate downlink channel state. To this end, the channel state information RS (CSI-RS) is used in LTE-A system.

Figure 20:
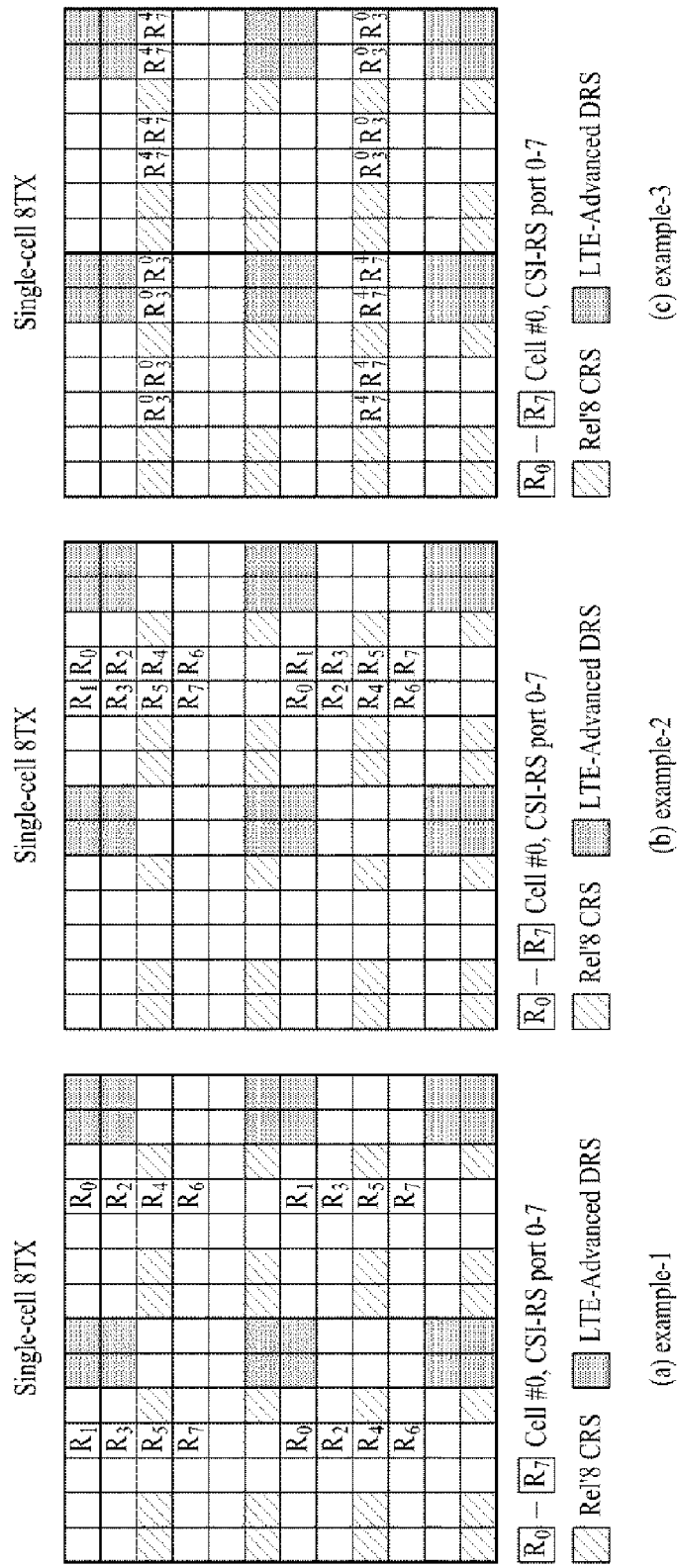
FIG. 20 illustrates examples of CSI-RS patterns for supporting 8 transmission antennas.

FIG. 20 illustrates examples of CSI-RS patterns for supporting 8 transmission antennas.

Referring to FIG. 20, the CSI-RS can be transmitted in PDSCH region. In a subframe in which the CSI-RS is transmitted, CRS(s) of LTE system can be transmitted for supporting LTE UEs and DRS(s) of LTE-A system can be transmitted for demodulation.

CSI-RSs are Transmitted on Antenna Port(s) p∈{15 . . . 22}. In FIG. 20. CSI-RS Ports 0 to 7 Respectively Correspond to Antenna Ports 15 to 22 in One Cell or One Bs.

CSI-RS design is an important aspect of the system because it affects transmission scheme for a future wireless communication system. Especially, for multiple antenna transmission techniques such as cooperative multi-point (CoMP) transmission, it is necessary to achieve measurement enhancements for the serving cell and inter cell.

To support any future wireless communication system utilizing multi-antenna transmission techniques, the CSI-RS should be designed so that the CSI-RS transmission does not limit future feedback mechanisms and multi-antenna transmission techniques such as coordinated beamforming and joint processing.

One efficient method of supporting higher channel measurement performance for other cells is to mute REs in CSI-RS RE positions of other cells (or antenna group transmission points). Considering the fact that cells cooperating in CoMP transmissions would be cells in which have the greatest interference/signal power to UEs, a UE can take measurements from the channel of a certain cooperating cell without the strongest interfering signals if nothing is transmitted in CSI-RS REs in which the other cooperating cells transmit their CSI-RSs. This technique which is the second scheme of the present invention can help increase CSI-RS measurement performances and allow better feedback accuracy for multi-antenna transmission techniques.

2-1. CSI-RS Orthogonality

Figure 21:
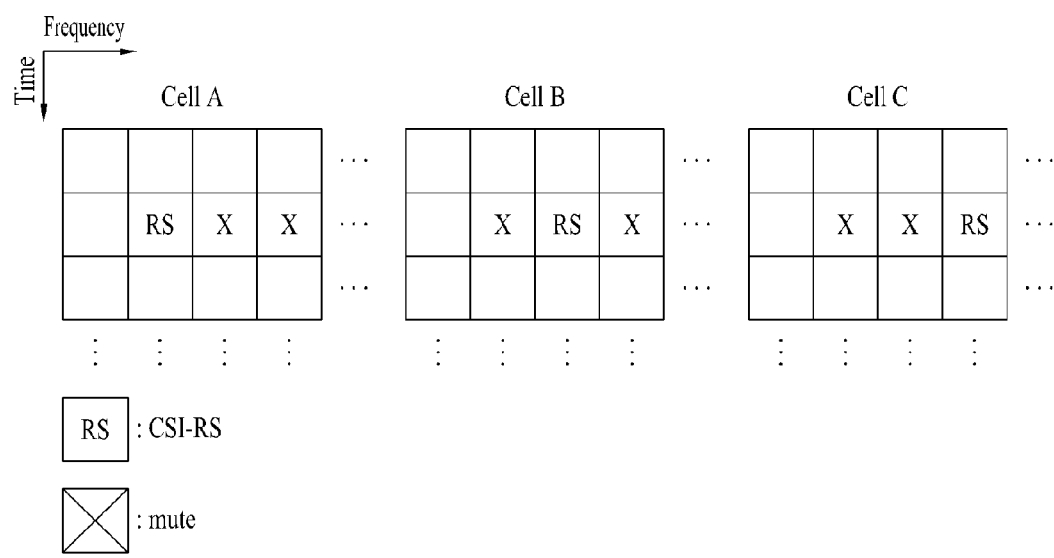
FIG. 21 shows a conceptual drawing of CSI-RS insertion and RE muting coordination for other cell channel measurements.

FIG. 21 shows a conceptual drawing of CSI-RS insertion and RE muting coordination for other cell channel measurement.

The REs being muted for a serving cell should be positioned so that it is placed on the same time/frequency RE as CSI-RS REs of the other cooperating cells. This also means that for the coordinating cells the CSI-RS RE positions should not overlap in time/frequency domain. Accordingly, the present invention suggests designing CSI-RS positions of the cooperating cells to satisfy orthogonality from each other. The CSI-RS orthogonality between the cooperating cells can be achieved by allocating CSI-RSs to a subframe so that CSI-RS positions in the subframe do not overlap.

The CSI-RS orthogonality can be achieved by allocating CSI-RSs in a subframe cell-specifically or BS-specifically. In other words, CSI-RSs of different cells or BSs are transmitted in different REs in the subframe. Hereinafter, for convenience of description, the present invention allocates CSI-RSs of different cooperating cells to different REs even though the cooperating cells belong to the same BS. If a plurality of BSs cooperate to provide a UE with a wireless communication service, CSI-RSs of the cooperating BSs will be transmitted in different REs. The CSI-RS positions in a subframe may be determined orthogonally according to coordination/cooperation of neighboring cells which performs CoMP transmission/communication together. To this end, processors of the cooperating BSs can determine REs for CSI-RS transmission through mutual adjustment so that the orthogonality among the CSI-RS positions is achieved.

In the mean time, the muted REs should be informed to all UEs in the serving cell, and data RE around the muted REs should be rate-matched. This is because the transparent RE muting/erasure at the BS side heavily affects transmission performance. Besides, in order for coordinated CSI-RS transmission to work effectively, UEs with the muted RE knowledge should not use the muted CSI-RS REs for interference measurement purpose. This is because if the UEs are implemented to take interference measurements from the muted CSI-RS REs, then it may be difficult for the other cooperating cells to transmit their CSI-RSs in the CSI-RS REs which the serving cell muted, without causing effects in interference measurements.

Figure 22:
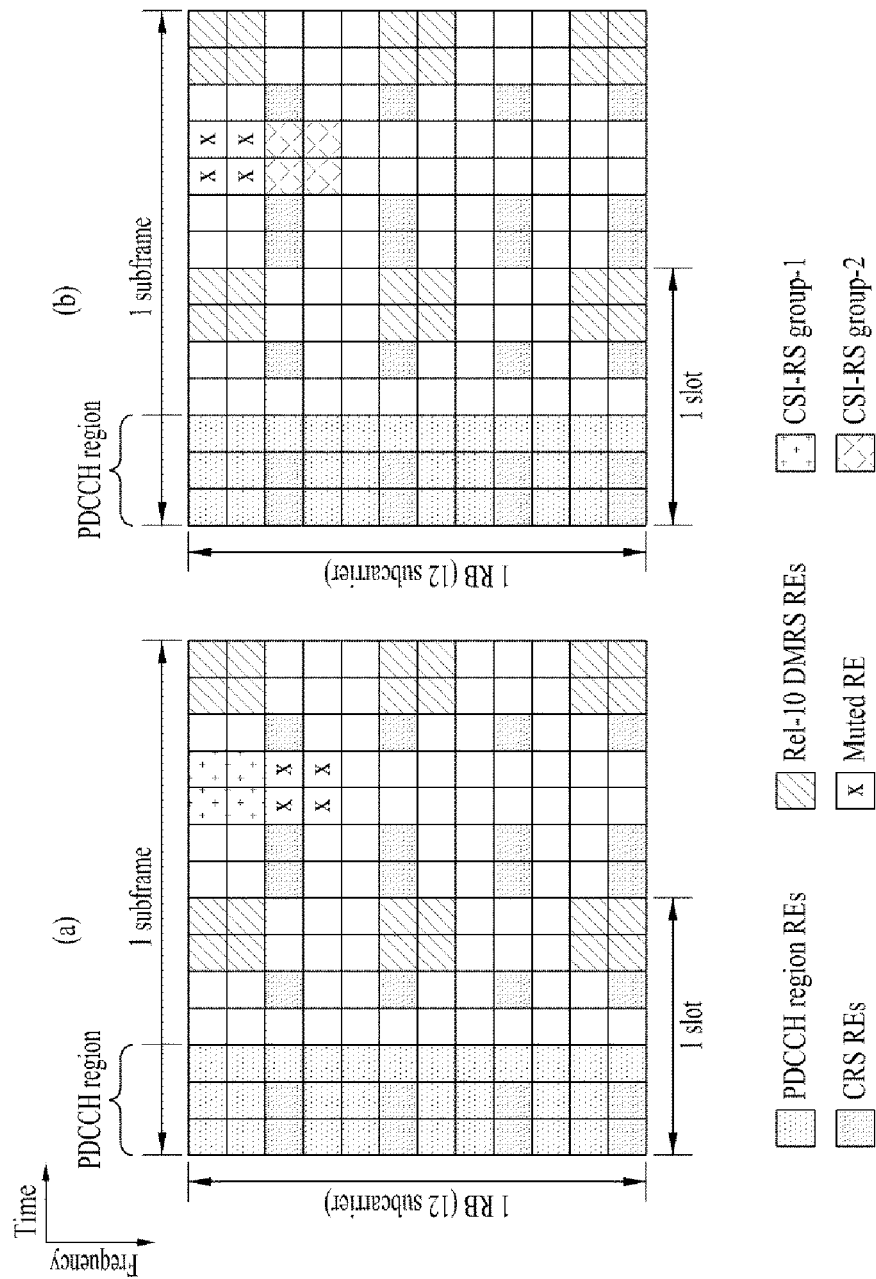
FIG. 22 illustrates an example of CSI-RS position and RE muting position in an RB.

FIG. 22 illustrates an example of CSI-RS position and RE muting position in an RB. For example, it is supposed that 4 CSI-RS ports of a cell A transmits CSI-RS group-1 for 4 antennas in the cell A, and 4 CSI-RS ports of another cell B transmits CSI-RS group-2 for 4 antennas in the cell B. The cells A and B may belong to the same BS or belong to different BSs.

Referring to FIG. 22(a), the CSI-RS ports of the cell A transmit CSI-RSs on the first and second subcarriers in the third and fourth symbols of the second slot in the RB, while muting the third and fourth subcarriers in the third and fourth symbols of the second slot in the RB. Referring to FIG. 22(b), the CSI-RS ports of the cell B transmit a CSI-RSs on the third and fourth subcarriers in the third and fourth symbols of the second slot in the RB, while muting the first and second subcarriers in the third and fourth symbols of the second slot in the RB.

If a UE transmits/receives a signal via both the cell A and the cell B, the UE may estimate/measure channel state/quality of the cell A based on the CSI-RS group-1 without the interference of the CSI-RS group-2, and also estimate/measure channel state/quality of cell B based on the CSI-RS group-2 without the interference of the CSI-RS group-1.

2-2. Subframes for CSI-RS Transmission

Figure 23:
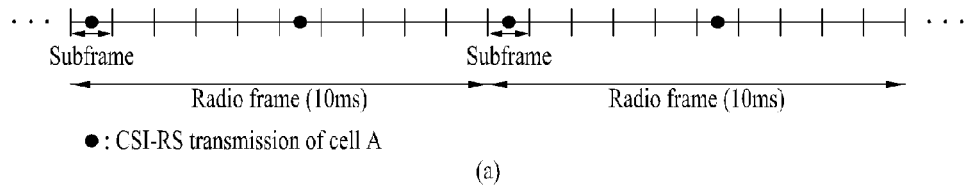
FIG. 23 illustrates examples of CSI-RS transmission duty cycle.
Figure 23:
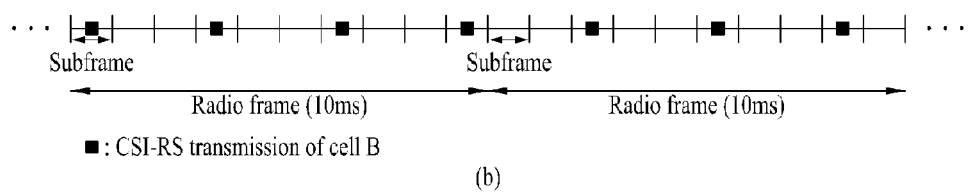

FIG. 23 illustrates examples of CSI-RS transmission duty cycle.

In order to prevent the increase of RS overhead, the CSI-RS is transmitted with a certain duty cycle. Referring to FIG. 23(a), a BS may transmit CSI-RS for antenna(s) of a cell belonging to the BS every 5 subframes. A UE located in the cell may receive the CSI-RSs transmitted via the cell and estimate/measure state/quality of the channel configured between the UE and the antennas of the cell. If the UE communicates with the cell only, the UE does not have to monitor every subframes for detecting the CSI-RS of the cell, but may monitor only every 5 subframes from the first subframe having the CSI-RS.

However, if the UE communicates through a plurality of cells and each of the plurality of cells transmits their CSI-RSs, the number of subframes the UE has to monitor increases as shown in FIGS. 21(a) and 21(b). If the duty cycle of CSI-RS transmission can be different per cell, the number of subframes the UE has to try to detect a CSI-RS also increases. This makes the processing load of the UE increase, thereby decreasing the performance of the UE.

(1) CSI-RS Transmission Duty Cycle

Accordingly, in order to decrease the processing load of the UE thereby increasing system throughput, the present invention provides an embodiment that CSI-RSs of cooperating cells are coordinated to be transmitted concurrently in one or several subframes. In other words, according to this embodiment, some CSI-RS transmissions of cooperating cells are overlapped in certain subframes. To this end, each BS according to the second scheme of the present invention transmits CSI-RS(s) of its cell(s) with a duty cycle of multiples of N where N is a predefined/predetermined value. N may be predefined/predetermined as a number of subframes, a time period and the like. N may be defined as 5 subframes, or defined as 5 ms, for instance. For convenience of description, it will be described that N is a predefined number of subframes. For example, duty cycles of CSI-RS transmission can be one of multiples of N subframes, and each BS transmit a CSI-RS of its cell with a periodicity of a duty cycle. Namely, duty cycles of cells neighboring or cooperating with each other have a relation of a common multiple or a common divisor from each other.

A processor 400b of a BS according to the present invention can determine a duty cycle for transmitting a CSI-RS of a cell. When determining the duty cycle, the processor 400b of the BS can determine a multiple of N as the duty cycle for the cell. The processor 400b of the BS can control a transmitter 100b of the BS to allocate the CSI-RS of the BS to corresponding REs in a subframe, and control the transmitter 100b of the BS to transmit the CSI-RS with the duty cycle. A receiver 300a of a UE in the cell can receive the CSI-RS with the duty cycle and transfer the CSI-RS to a processor 400a of the UE, and the processor 400a of the UE can estimate channel state/quality of the cell by using the CSI-RS of the cell.

Figure 24:
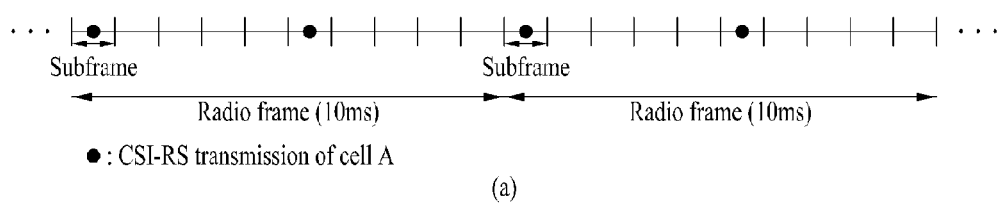
FIG. 24 illustrates an example of CSI-RS transmissions in cooperating cells according to the present invention.
Figure 24:
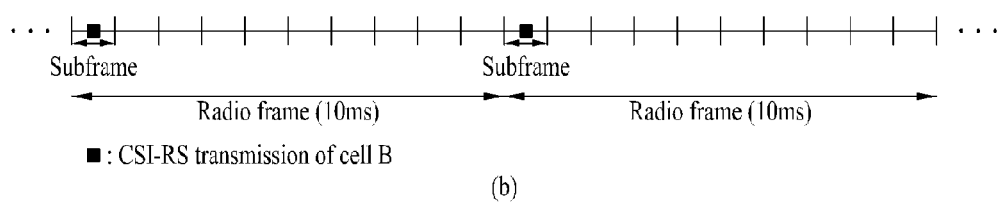

FIG. 24 illustrates an example of CSI-RS transmissions in cooperating cells according to the present invention. It is assumed that N is 5 subframes, and a CSI-RS for the cell A is transmitted with a duty cycle of 1×5 subframes and a CSI-RS for the cell B is transmitted with a duty cycle of 2×5 subframes.

According to this embodiments or the present invention, not every subframe but specific some subframes carries CSI-RS(s) so that the processing load of the UE. For example, as shown in FIG. 24, according to the embodiment of CSI-RS transmission, the first subframes of each radio frame carry both the CSI-RS for the cell A and the CSI-RS for the cell B. Accordingly, the UE located in the cell A and the cell B may monitor only every 5 subframes starting from a subframe having the CSI-RS for the cell A or the CSI-RS for the cell B.

According to this embodiment of the present invention, the periodicity of CSI-RS transmission can be only one of multiples of N, i.e., a duty cycle of CSI-RS is one of $\{1 \times N, 2 \times N, 3 \times N, \ldots, MAX_{DutyCycle}\}$. A processor 400b of a BS can choose one of multiples of N as a CSI-RS transmission duty cycle for a certain cell.

In the meantime, the $MAX_{DutyCycle}$ will be determined taking account into channel state fluctuation according to time variation, system requirements of channel state accuracy, and the like.

(2) Subframe Offset

Besides, in order to make CSI-RS transmission subframes collide with each other at some time, a start subframe where a duty cycle begins shall be defined properly. Otherwise, collision between subframes carrying each cell's CSI-RS may not occur during CoMP transmission/communication of the corresponding cells, and in this case the number of subframes a UE has to monitor increases. Accordingly, the present invention proposes that CSI-RS transmissions of cooperating cells be synchronized in at least one subframe. If CSI-RSs of the cooperating cells are transmitted together in a certain subframe, then the CSI-RSs of the cooperating cells are to be transmitted together every common multiple of their CSI-RS transmission duty cycles. To this end, the present invention provides an embodiment that CSI-RSs of one of the cooperating cells are transmitted in subframes of which subframe numbers have the same remainder after divided by N where the subframes are numbered from 0 to X−1 where X is the longest one of the cooperating cell's duty cycles. For example, if N is 3 and the longest duty cycle in the cooperating cell's duty cycles is 10×3=30, then the subframes for CoMP transmission are numbered from 0 to 29 and subframes carrying a CSI-RS of any one of the cooperating cells may have to have the same SubframeOffset value when calculated by the following Math Figure.

MathFigure 9

$$SubframeOffset = SubframeNumber \text{ in } DutyCycle_{MAX} \pmod{N} \quad \text{[Math.9]}$$

In Math FIG. 9, 'SubframeNumber in DutyCycle$_{MAX}$' denotes a subframe number of a subframe carrying a CSI-RS among subframes numbered sequentially from 0 to X−1 where X is the longest duty cycle in the CSI-RS transmission duty cycles of the cooperating cells.

Besides, the present invention provides another embodiment that CSI-RSs of one of the cooperating cells are transmitted in subframes of which subframe numbers have the same remainder after divided by N when subframes in each radio frame are number from 0 to 9 as shown in FIG. 3. For example, if N is 5 and subframes in each radio frame are numbered from 0 to 9 as shown in FIG. 3, then the subframes carrying a CSI-RS of any one of the cooperating cells may have to have the same SubframeOffset according to the following Math Figure.

MathFigure 10

SubframeOffset=SubframeNumber in a radio frame
(mod $N$)     [Math.10]

In Math FIG. 10, SubframeOffset denotes a subframe number of a subframe carrying a CSI-RS in a radio frame where subframes in each radio frame are numbered sequentially from 0 to 9.

When a neighboring BS transmit a CSI-RS of its cell in a subframe of which subframe number has a certain remainder after divided by N, a processor 400b of a serving BS can control a transmitter 100b of the serving BS to transmit a CSI-RS of its cell in a subframe of which subframe number has the certain remainder after divided by N. The processor 400b of the serving BS can control the transmitter 100b of the serving BS to transmit the CSI-RS of its cell with a duty cycle of m×N ms or subframes where m is a positive integer.

In order for a UE to estimate/measure channel state/quality of a certain cell according to the present invention, the UE should know which subframe carries a CSI-RS of the certain cell. To this end, a BS may transmit information indicating a CSI-RS transmission duty cycle of the certain cell and/or a subframe offset specifying a subframe carrying the CSI-RS in a certain duty cycle or a radio frame. A processor 400b of the BS can generate the information indicating the CSI-RS transmission duty cycle of the certain cell and/or the subframe offset remainder the subframe carrying the CSI-RS. The processor 400b of the BS can control a transmitter 100b of the BS to transmit the information to UEs in coverage of the BS.

In the meantime, a plurality of BSs can coordinate to transmit their CSI-RSs in a subframe having the same subframe offset. Processors of the plurality of BSs can communicate with each other and determine their subframe offset(s) via mutual adjustment. Since the duty cycles of the cooperating BSs are multiples of N, there will be some subframes on which all the plurality of BSs transmit CSI-RSs. Referring to FIG. 24, the subframe offsets of the cells A and B are the same since the subframe offset of A is 0(mod 5)=5(mod 5)=0 and the subframe offset of the cell B is 0(mod 5)=10(mod 5)=0. At least one or each of the plurality of BSs may transmit information indicating the subframe offset to a UE in their coverage. A processor 400b of a BS can generate the information indicating the subframe offset and control a transmitter 100b of the BS to transmit the information to UEs in the BS's coverage. A UE receives the information and recognize which subframe in a radio frame carries CSI-RS(s) of a serving cell and/or a neighboring cell. A receiver 300a of the UE receives the information and transfer the information to a processor 400a of the UE. The processor 400a of the UE can determine based on the information which subframes carry the CSI-RS.

Figure 25:
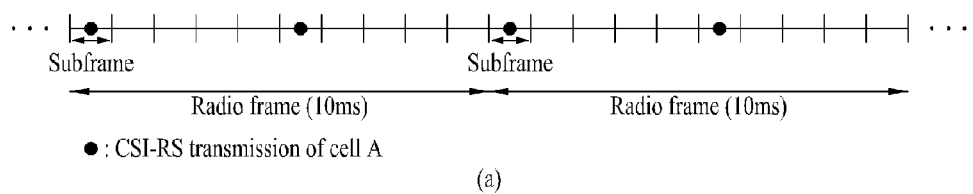
FIG. 25 illustrates another example of CSI-RS transmissions in cooperating cells according to the present invention.
Figure 25:
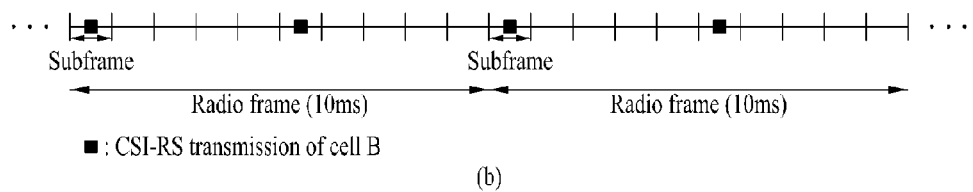

FIG. 25 illustrates another example of CSI-RS transmissions in cooperating cells according to the present invention.

It is also possible that the plurality of BSs coordinate to transmit their CSI-RSs with the same duty cycle in subframes having the same subframe offset. A processor 400b of a BS can control a transmitter 100b of the BS to transmit a CSI-RS of a cell with a certain duty cycle in subframes having the same subframe offset as a neighboring cell. A processor 400a of a UE can control a receiver 300a of the UE to monitor a subframe having the subframe offset at time intervals of the duty cycle. The processor 400a of the UE can estimate channel state/quality of the cell based on the CSI-RS of the cell and/or channel state/quality of the neighboring cell based on the CSI-RS of the neighboring cell. Referring to FIG. 25, according to the present invention, subframes carrying CSI-RSs of the cooperating cells always collide. At least one or each of the plurality of BSs may transmit information indicating the duty cycle and the subframe offset to UE(s) in their coverage. A processor 400b of at least one of the plurality of BSs can generate the information and control a transmitter 100b, operatively coupled to the processor 400b, to transmit the information.

In the mean time, the duty cycle and the subframe offset for CSI-RS transmission of a cell can be transmitted as one information to a UE according to the following table.

TABLE 5

| $I_{cycle,\ subframe\ offset}$ | Duty cycle | Subframe offset |
| --- | --- | --- |
| $I_{cycle,\ subframe\ offset} \leq 4$ | 5 | $I_{cycle,\ subframe\ offset}$ |
| $5 \leq I_{cycle,\ subframe\ offset} \leq 14$ | 10 | $I_{cycle,\ subframe\ offset} - 5$ |
| $15 \leq I_{cycle,\ subframe\ offset} \leq 34$ | 20 | $I_{cycle,\ subframe\ offset} - 15$ |
| $35 \leq I_{cycle,\ subframe\ offset} \leq 74$ | 40 | $I_{cycle,\ subframe\ offset} - 35$ |
| $75 \leq I_{cycle,\ subframe\ offset} \leq 154$ | 80 | $I_{cycle,\ subframe\ offset} - 75$ |

In Table 5, $I_{cycle,subframe\ offset}$ indicates a duty cycle and a subframe offset for CSI-RS transmission. Referring to Table 5, if $I_{cycle,subframe\ offset}$ is larger than 4 and less than 15, a CSI-RS of a cell should be transmitted every 10 subframes starting from a subframe of which subframe number in a radio frame is $I_{cycle,subframe\ offset} - 5$. The $I_{cycle,subframe\ offset}$ can be determined by higher layers signaling, for example, medium access control (MAC) signaling, radio resource control (RRC) signaling and the like. The $I_{cycle,subframe\ offset}$ for the cooperating cells may be determined to have the same value for cooperating cells, or may be determined to have different values for the respective cooperating cells. The BS(s) of the cooperating cells can determine or coordinate $I_{cycle,subframe\ offset}$ for the cooperating cells, and transmit $I_{cycle,subframe\ offset}$ to a UE. Only one of cooperating BSs may transmit $I_{cycle,subframe\ offset}$(s) to a UE, or each of the cooperating BSs may transmit $I_{cycle,subframe\ offset}$ of a corresponding cell to the UE. The UE can recognize the duty cycle and the subframe offset of the corresponding cell based on the $I_{cycle,subframe\ offset}$.

A processor 400b of at least one of the cooperating BS or a radio resource controller operatively coupled to the cooperating BSs may determine $I_{cycle,subframe\ offset}$. The processor 400b can control a corresponding transmitter 100b to transmit $I_{cycle,subframe\ offset}$ to a UE in coverage of a corresponding BS. A receiver 300a of the UE can receive/detect $I_{cycle,subframe\ offset}$(s) and transfer to a processor 100a of the UE, and the processor 100b of the UE can recognize which subframes carry the CSI-RSs of the cooperating BSs based on $I_{cycle,subframe\ offset}$(s).

2-3. CSI-RS RE Muting in the Time Domain

When duty cycles of neighboring cells are multiples of N where N is a predetermined value, it should be defined when and/or how a BS mutes other cell's CSI-RS REs so as to allow a UE to measure/estimate channel state of a specific cell. The embodiments of muting CSI-RS REs according to the present invention will be described in detail. The following embodiments of CSI-RS RE muting can be combined with the aforementioned embodiments 2-1 and 2-2 of the present invention.

FIG. 26 to FIG. 32 illustrate operation examples among a plurality of BSs that transmit CSI-RSs in accordance with CSI-RS RE muting embodiments of the present invention.

For convenience of description it is assumed that a UE communicates in three cells A, B and C which belong to three BSs A, B and C, respectively. However, the embodiments of the present invention which will be described hereinafter can be applied to a case that some or all of the cells A, B and B belong to the same BS. It is also assumed that a CSI-RS of cell is A transmitted with a duty cycle of N subframes, a CSI-RS of cell B is transmitted with a duty cycle of 2×N subframes and a CSI-RS of cell C is transmitted with a duty cycle of 3×N subframes. It is also assumed that the subframe offsets for CSI-RS transmissions of the cells A, B and C are the same.

(1) First Embodiment of CSI-RS RE Muting

Figure 26:
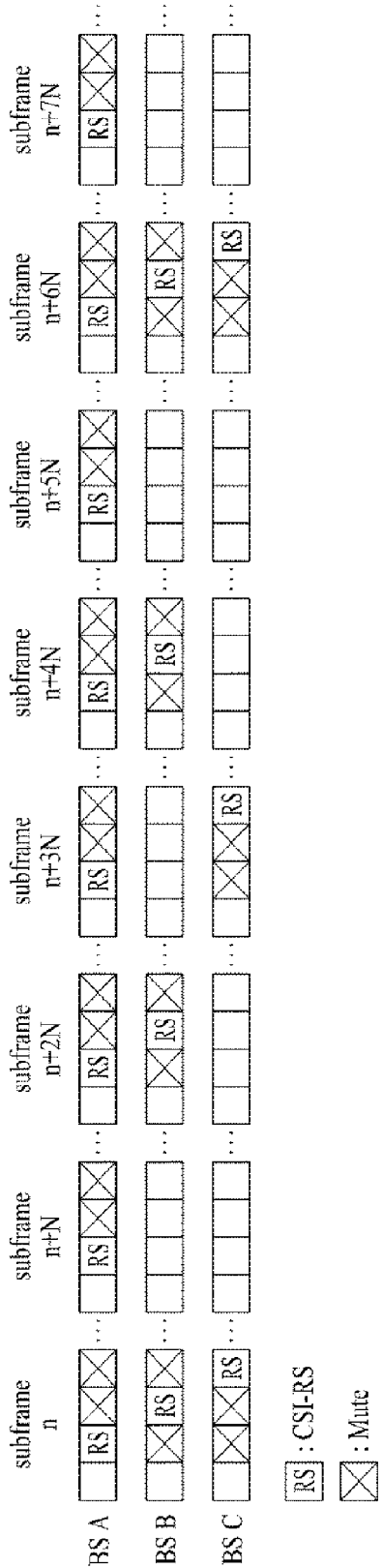
FIG. 26 to FIG. 32 illustrate operation examples among a plurality of BSs that transmit CSI-RSs in accordance with CSI-RS RE muting embodiments of the present invention.

Each BS can mute REs available for other cell's CSI-RS transmission in a subframe carrying CSI-RS(s) of a corresponding cell. As shown in FIG. 26, the other cell's CSI-RS(s) do not have to be actually transmitted in the muted REs. Referring to FIG. 26, the BS A transmits a CSI-RS of the cell A every N subframes with muting the CSI-RS REs of the cells B and C in the subframes carrying the CSI-RS of the cell A, the BS B transmits a CSI-RS of the cell B every 2×N subframes with muting the CSI-RS REs of the cells A and C in the subframe carrying the CSI-RS of the cell B, and the BS C transmits a CSI-RS of the cell B every 3×N subframes with muting the CSI-RS REs of the cells A and B in the subframe carrying the CSI-RS of the cell C.

According to this embodiment, a channel state of a neighboring cell can be measured with higher accuracy than without muting. It is because the CSI-RS REs for the neighboring cell is muted in a serving cell, so a UE in the serving cell can measure the CSI-RS of the neighboring cell in the muted REs without the signal interference by the serving cell. For example, referring to FIG. 26, a UE in a cell B can measure channel state of the cell B based on the CSI-RS of the cell B which is received every 2×N, and measure channel state of cell A based on the CSI-RS of the cell A without signal interference of the cell B.

(2) Second Embodiment of CSI-RS RE Muting

Figure 27:
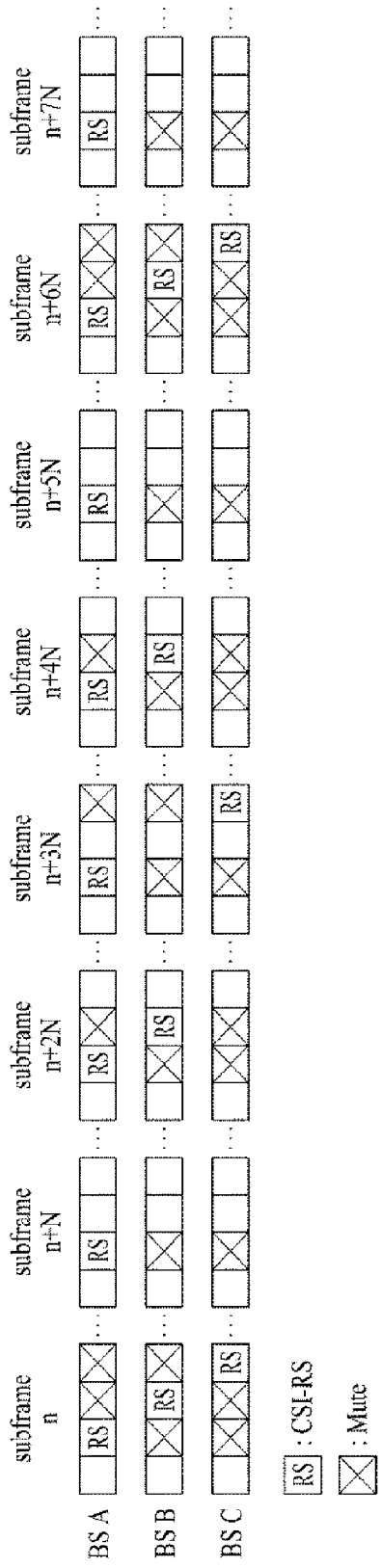

Each BS can mute REs, on which CSI-RS(s) of the other cell(s) are actually transmitted, in a subframe irrespective of whether the subframe carries a CSI-RS of the corresponding cell or not. Referring to FIG. 27, the BS A transmits a CSI-RS of the cell A every N subframes with muting all the REs on which the CSI-RSs of the cells B and C are transmitted, the BS B transmits a CSI-RS of the cell B every 2×N subframes with muting all the REs on which the CSI-RSs of the cells A and C are transmitted, and the BS C transmits a CSI-RS of the cell B every 3×N subframes with muting all the REs on which the CSI-RSs of the cells A and B.

According to this embodiment, a UE can measure channel state/quality of a certain cell without signal interference of other cooperating cells since all the REs on which CSI-RSs of the other cooperating cells are transmitted are muted in the other cooperating cells. For example, referring to FIG. 27, a UE in a cell B can measure channel state of the cell B based on the CSI-RS of the cell B which is received every 2×N, and measure channel state of cell A based on the CSI-RS of the cell A without signal interferences of the cells B and C.

This embodiment is more advantageous than the first embodiment in that the UE can measure/estimate channel state with higher accuracy, but disadvantageous in that the number of muted REs increases thereby decreasing the number of REs available for data transmission and the muting patterns are more complex than the first embodiment.

(3) Third Embodiment of CSI-RS RE Muting

The muted REs cannot be used for signal transmission in a corresponding cell. Namely, the increase of the number of the muted REs means increase of the throughput loss in a wireless communication system.

Figure 28:
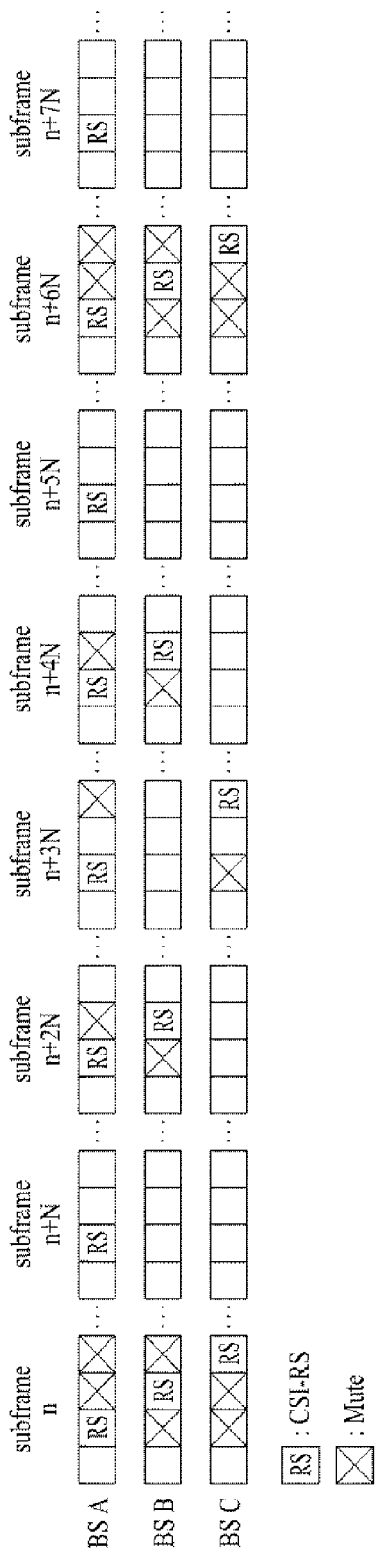

In order to decrease waste of downlink resource, each BS can mute REs available for other cell's CSI-RS transmission in a subframe carrying CSI-RS(s) of a corresponding cell, wherein only REs on which CSI-RSs of the other cells are actually transmitted are muted. Referring to FIG. 28, the BS A transmits a CSI-RS of the cell A every N subframes with muting the CSI-RS REs of the cells B and C every N subframes wherein CSI-RS REs on which the CSI-RSs of the cells B and C are actually transmitted are muted. Likewise, the BS B transmits a CSI-RS of the cell B every 2×N subframes with muting the CSI-RS REs of the cells A and C every 2×N subframes wherein CSI-RS REs on which the CSI-RSs of the cells A and C are actually transmitted are muted, and the BS C transmits a CSI-RS of the cell C every 3×N subframes with muting the CSI-RS REs of the cells A and B every 3×N subframes wherein CSI-RS REs on which the CSI-RSs of the cells A and B are actually transmitted are muted.

According to this embodiment, a UE in a serving cell can measure a CSI-RS of a neighboring cell in the muted REs without the signal interference by the serving cell since the CSI-RS REs for the neighboring cell is muted in a serving cell. For example, referring to FIG. 28, a UE in a cell B can measure channel state of the cell B based on the CSI-RS of the cell B which is received every 2×N, and measure channel state of cell A based on the CSI-RS of the cell A without signal interference of the cell B. This embodiment is more advantage than the first and second embodiments in that the number of muted REs decreases.

(4) Fourth Embodiment of CSI-RS RE Muting

In order to decrease downlink resources being wasted while simplifying a CSI-RS muting pattern, this embodiment mutes CSI-RS REs every a common multiple of CSI-RS transmission duty cycles.

Figure 29:
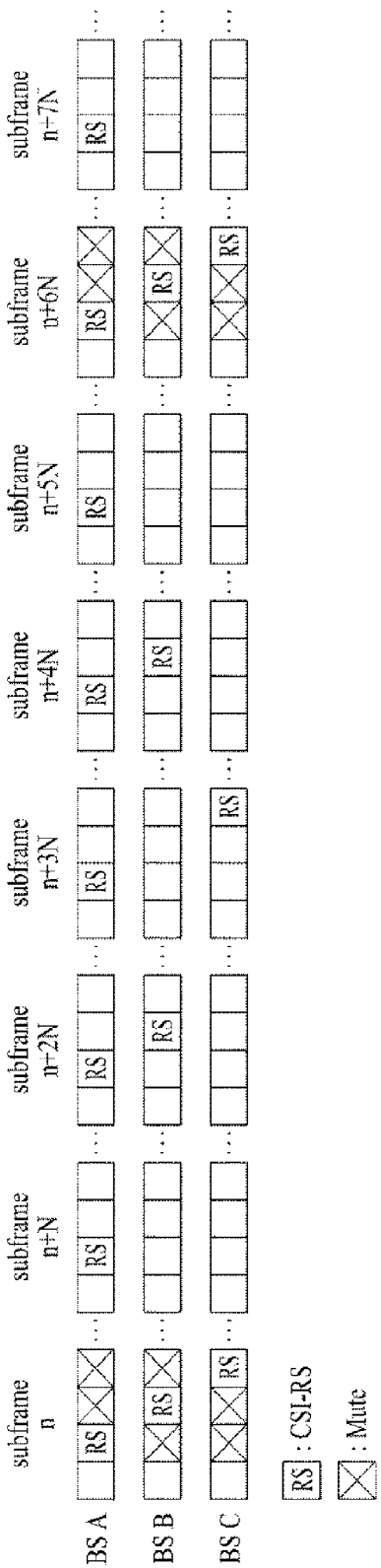

Referring to FIG. 29, the lowest common multiple of N, 2×N and 3×N is 6×N, so each BS can mute CSI-RS REs every 6×N subframes.

A UE can measure/estimate channel state of each cell based on CSI-RSs transmitted with a duty cycle of a corresponding cell. The UE can estimate CSI-RSs in subframes carrying CSI-RSs of all the cooperating cells with higher accuracy than the other subframe carrying CSI-RSs of one or some of the cooperating cells. Referring to FIG. 29, a UE in the cell B can measure/estimate channel state of the cell B based on the cell B's CSI-RS transmitted every 2×N, and also measure/estimate channel state of cell A based on the CSI-RS of the cell A and channel state of cell C based on the CSI-RS of the cell C. In this case, the UE can obtain more accurate channel states of the cells A, B and C in subframes n, n+6N, n+12N, and etc, since the UE receives CSI-RS(s) of only one cell and would not receive any other data/RS/control signal in the subframes n, n+6N, n+12N, and etc.

(5) Fifth Embodiment of CSI-RS RE Muting

Figure 30:
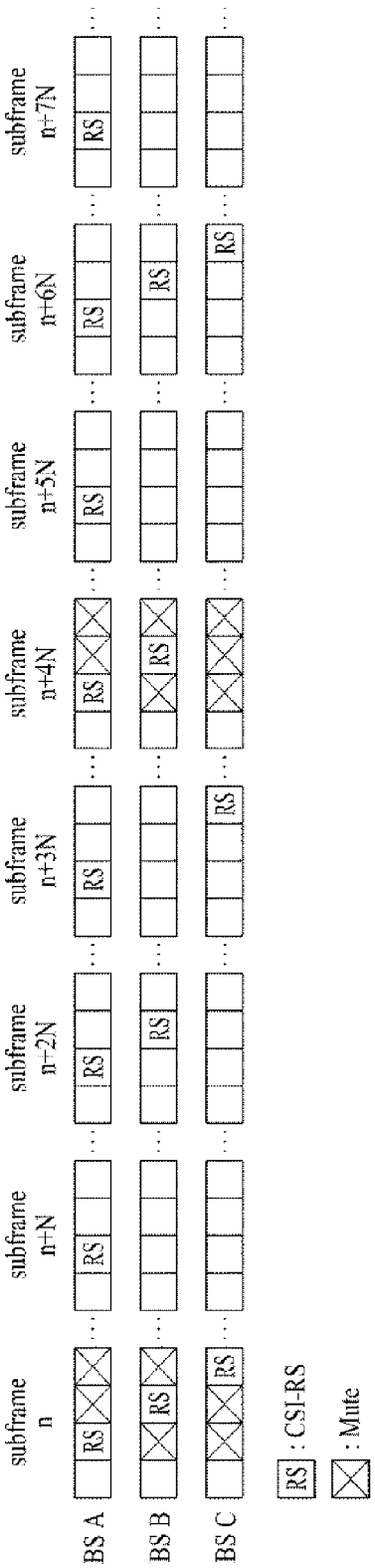

It is possible to define CSI-RS RE muting cycle irrespective of CSI-RS transmission duty cycles. Referring to FIG. 30, each BS can mute CSI-RS REs every 4×N subframes. According to this embodiments, subframes corresponding to a common multiple of CSI-RS transmission duty cycle(s) and CSI-RS RE muting cycle only could include CSI-RSs of the cells A, B and C and muted REs.

(6) Sixth Embodiment of CSI-RS RE Muting

Figure 31:
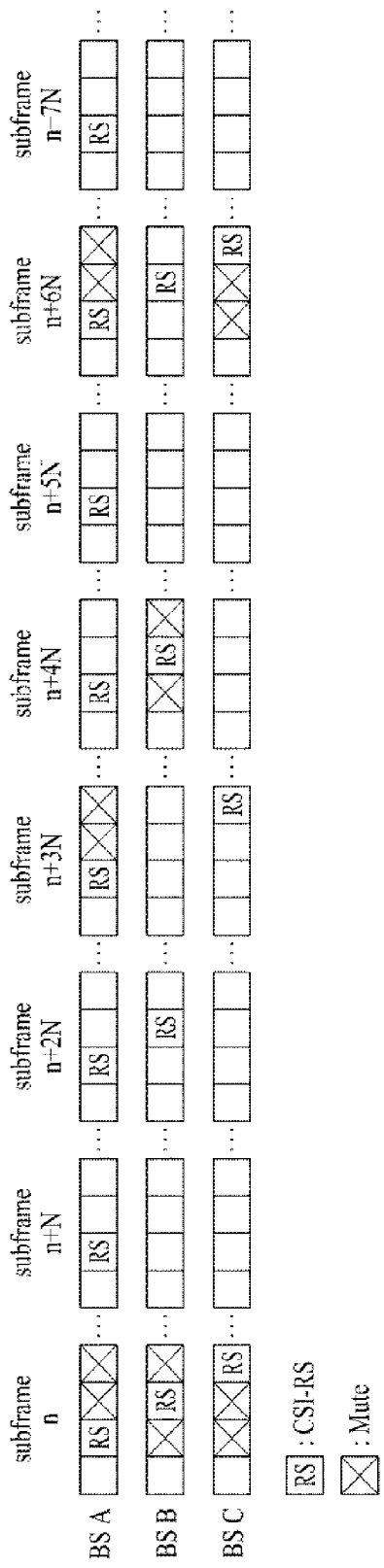

It is possible to define a CSI-RS RE muting cycle depending on a cell. Referring to FIG. 31, the BS A mutes CSI-RS REs for the cells B and C every 3×N subframes, the BS B mutes CSI-RS REs for the cells A and C every 4×N subframes, and the BS C mutes CSI-RS REs for the cells A and B every 6×N subframes. In this case, since a muting cycle for CSI-RS RE of a cell is determined in a cell-dependent manner, each or at least one of the cooperating BSs transmits information informing a UE of the muting cycle.

The UE can perform channel measurement of the other cell with higher accuracy in the muted REs of a serving cell.

(7) Seventh Embodiment of CSI-RS RE Muting

The longer CSI-RS transmission duty cycle a cell has, the better the channel state of the cell would be. Or the longer CSI-RS transmission duty cycle a cell, the less time-variant the channel state of the cell would be. Accordingly, the seventh embodiment of CSI-RS RE muting according to the present invention defines a CSI-RS RE muting cycle depending on a CSI-RS transmission duty cycle. For example, a CSI-RS RE muting cycle can be defined as a multiple of a CSI-RS transmission duty cycle.

Figure 32:
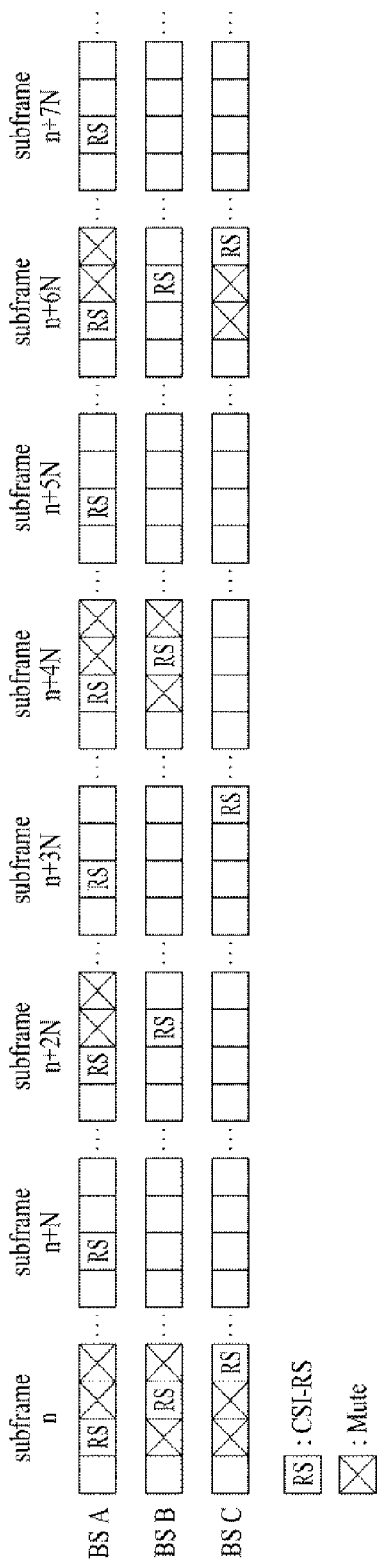

Referring to FIG. 32, the BS A can transmit a CSI-RS of the cell A every N subframes while muting CSI-RS REs for the cells B and C every 2×N subframes, the BS B can transmit a CSI-RS of the cell B every 2N subframes while muting CSI-RS REs for the cells A and C every 2×2N subframes, and the BS C transmits a CSI-RS of the cell C every 3N subframes while muting CSI-RS REs for the cells A and B every 2×3N subframes.

A UE can receive the CSI-RS of the cell A every N subframes and a half number of the subframes carrying the CSI-RS of the cell A will have muted CSI-RS REs. Likewise, the UE can receive the CSI-RS of the cell B every 2N subframes and a half of the subframes carrying the CSI-RS of the cell B will have muted CSI-RS REs, and can receive the CSI-RS of the cell C every 3N subframes and a half of the subframes carrying the CSI-RS of the cell C will have muted CSI-RS REs. The UE can measure channel state of a certain cell based on a CSI-RS of the certain cell which is received in the muted RE(s).

A processor 400b of a BS can control a transmitter 100b of the BS to transmit a CSI-RS of a cell according to one of embodiments described in 2-1 and 2-2 while muting CSI-RS RE(s) according to one of the first to seventh embodiments above. A receiver 300a of a UE in the cell can receive the CSI-RS of the cell and can receive a CSI-RS of a neighboring cell in the muted RE(s), and a processor 400a of the UE can estimate channel state of the cell based on the CSI-RS of the cell. The processor 400a of the UE can estimate channel state of the neighboring cell based on the CSI-RS of the neighboring cell which is transmitted in the muted REs by a BS of the neighboring cell. In this case, the processor 400a of the UE can estimate channel state of the neighboring cell more accurately since the signal interference of the cell does not exist due to the CSI-RS RE muting.

2-4. CSI-RS RE Muting in the Frequency Domain (1) Full RE Muting in the Frequency Domain All the CSI-RS REs for the neighboring cells can be muted in the frequency domain when muting CSI-RS RE(s) according to one of the first to seventh embodiments above. A processor 400b of a BS can control a transmitter 100b of the BS to mute CSI-RS RE(s) according to one of the first to seventh embodiments above, wherein the CSI-RS RE(s) are muted over a whole system bandwidth. In this case, a processor 400a of a UE can perform channel estimation of a neighboring cell with higher accuracy over the whole system bandwidth.

(2) Partial RE Muting in the Time Domain

Or partial RE muting in the frequency domain can be considered to minimize the number of muted REs while allowing the channels of the other cells to be measured within a specific frequency band. In this case, the CSI-RS RE muting is only used in a specific frequency band, a UE only measures the channels of neighboring cell in the specific frequency band. The partial muting in the frequency domain can be used for a specific RBs such as even numbered RBs or odd numbered RBs. This embodiment can be also applied to one of the first to seventh embodiments above. A processor 400b of a BS can control a transmitter 100b of the BS to mute CSI-RS RE(s) according to one of the first to seventh embodiments above, wherein the processor 400b of the BS may mute the CSI-RS RE(s) in a specific frequency band. In this case, a processor 400a of a UE can perform channel estimation of a neighboring cell with higher accuracy in the specific frequency band.

According to the embodiments of the second scheme of the present invention, a UE can estimate channel state of a serving/neighboring cell without a signal of a neighboring/serving cell. Accordingly, the accuracy of channel state measurement and/or estimation increases.

It is advantageous according to the embodiments of the first scheme and/or the second scheme of the present invention in that the accurate inter-cell interference measurement and/or the accurate other cell channel estimation/measurement can be achieved thereby allowing a BS and a UE to perform better channel adaption in accordance with the instantaneous channel condition.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The embodiments of the present invention can be applied to a base station, a mobile station, or other communication device in a wireless communication system.

The invention claimed is:

1. In a base station in a wireless communicating system, a method for transmitting a channel state information reference signal (CSI-RS) of a cell, the method comprising: allocating the CSI-RS of the cell to a subframe; and transmitting the CSI-RS of the cell with a first duty cycle of 1×N subframes, where 1 is a positive integer and N is a predetermined value, wherein the transmitting transmits the CSI-RS of the cell with muting a resource element on which a CSI-RS of a neighboring cell is transmitted, with a second duty cycle of m×N subframes where m is a positive integer equal to or larger than 1.

2. The method of claim 1, wherein the CSI-RS of the neighboring cell is transmitted with a third duty cycle of n×N subframes where n is a positive integer, and m is the lowest common multiple of l and n.

3. The method of claim 1, wherein m is a multiple of 1.

4. The method of claim 1, wherein the CSI-RS of the cell and the CSI-RS of the neighboring cell are transmitted in subframes of which subframe numbers have the same remainder after divided by N.

5. In a base station in a wireless communicating system, a method for transmitting a channel state information reference signal (CSI-RS) of a cell, the base station comprising: a transmitter configured to transmit a signal; and a processor, operatively coupled to the transmitter, configured to allocate the CSI-RS of the cell to a subframe; and configured to control the transmitter to transmit the CSI-RS of the cell with a first duty cycle of 1×N subframes, where 1 is a positive integer and N is a predetermined value, wherein the processor is configured to control the transmitter to mute, with a second duty cycle of m×N subframes, resource element on which a CSI-RS of a neighboring cell is transmitted, where m is a positive integer equal to or larger than 1.

6. The base station of claim 5, wherein the CSI-RS of the neighboring cell is transmitted with a third duty cycle of n×N subframes where n is a positive integer, and the processor is configured to control the transmitter to mute the resource element with the second duty cycle of m×N subframes wherein m is the lowest common multiple of 1 and n.

7. The base station of claim 6, wherein the processor is configured to control the transmitter to mute the resource element every m×N subframes wherein m is a multiple of 1.

8. The base station of claim 6, wherein the processor is configured to control the transmitter to transmit the CSI-RS of the cell and the CSI-RS of the neighboring cell in subframes of which subframe numbers have the same remainder after divided by N.

9. In a user equipment located in a cell in a wireless communicating system, a method for receiving a channel state information reference signal (CSI-RS) of the cell, the method comprising: receiving the CSI-RS of the cell transmitted in a subframe with a first duty cycle of 1×N subframes, wherein the subframe includes, with a second duty cycle of m×N subframes, a muted resource element on which a CSI-RS of a neighboring cell is transmitted, where 1 is a positive integer, m is a positive integer equal to or larger than 1, and N is a predetermined value; and receiving the CSI-RS of the neighboring cell in the muted resource element; and measuring channel quality of the cell based on the received CSI-RS of the cell and channel quality of the neighboring cell based on the received CSI-RS of the neighboring cell.

10. The method of claim 9, wherein the CSI-RS of the neighboring cell is transmitted to the user equipment with a third duty cycle of n×N subframes where n is a positive integer, and m is the lowest common multiple of 1 and n.

11. The method of claim 9, wherein m is a multiple of 1.

12. The method of claim 9, wherein the CSI-RS of the cell and the CSI-RS of the neighboring cell are received in subframes of which subframe numbers have the same remainder after divided by N.

13. In a user equipment located in a cell in a wireless communicating system, a method for receiving a channel state information reference signal (CSI-RS) of the cell, the user equipment comprising: a receiver configured to receive a signal; and a processor configured to control the receiver to receive the CSI-RS of the cell transmitted in a subframe with a first duty cycle of 1×N subframes, wherein the subframe includes, with a second duty cycle of m×N subframes, a muted resource element on which a CSI-RS of a neighboring cell is transmitted, where 1 is a positive integer, m is a positive integer equal to or larger than 1, and N is a predetermined value; configured to control the receiver to receive the CSI-RS of the neighboring cell in the muted resource element; and configured to measure channel quality of the cell based on the received CSI-RS of the cell and channel quality of the neighboring cell based on the received CSI-RS of the neighboring cell.

14. The user equipment of claim 13, wherein the CSI-RS of the neighboring cell is transmitted to the user equipment with a third duty cycle of n×N subframes where n is a positive integer, and m is the lowest common multiple of 1 and n.

15. The user equipment of claim 13, wherein m is a multiple of 1.

16. The user equipment of claim 13, wherein the CSI-RS of the cell and the CSI-RS of the neighboring cell are received in subframes of which subframe numbers have the same remainder after divided by N.

* * * * *